(12) United States Patent
Woo et al.

(10) Patent No.: US 12,088,694 B2
(45) Date of Patent: Sep. 10, 2024

(54) METHOD FOR PROVIDING ENCRYPTED OBJECT AND ELECTRONIC DEVICE FOR SUPPORTING THE SAME

(71) Applicant: SAMSUNG ELECTRONICS CO., LTD., Suwon-si (KR)

(72) Inventors: Heejin Woo, Suwon-si (KR); Kyunghee Lee, Suwon-si (KR); Yongwook Kim, Suwon-si (KR); Sungjun Yi, Suwon-si (KR); Yoserb Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 17/553,145

(22) Filed: Dec. 16, 2021

(65) Prior Publication Data

US 2022/0209940 A1    Jun. 30, 2022

Related U.S. Application Data

(63) Continuation of application No. PCT/KR2021/017841, filed on Nov. 30, 2021.

(30) Foreign Application Priority Data

Dec. 24, 2020    (KR) .................. 10-2020-0183723

(51) Int. Cl.
*H04L 9/08* (2006.01)
*H04L 9/14* (2006.01)
*H04L 9/32* (2006.01)

(52) U.S. Cl.
CPC .......... *H04L 9/0825* (2013.01); *H04L 9/0869* (2013.01); *H04L 9/3247* (2013.01); *H04L 9/3263* (2013.01)

(58) Field of Classification Search
CPC ... H04L 9/0825; H04L 9/0869; H04L 9/3247; H04L 9/3263; H04L 9/0822; H04L 9/3268; H04L 9/14
See application file for complete search history.

(56) References Cited

U.S. PATENT DOCUMENTS

| | | | |
|---|---|---|---|
| 6,363,148 B1 | 3/2002 | Sako | |
| 2003/0108206 A1* | 6/2003 | Diehl | ............... H04N 21/23476 380/277 |

(Continued)

FOREIGN PATENT DOCUMENTS

| | | |
|---|---|---|
| JP | 10-164049 | 6/1998 |
| JP | 2014-505318 | 2/2014 |

(Continued)

OTHER PUBLICATIONS

Hybrid Encryption/Decryption Technique Using New Public Key and Symmetric Key Algorithm, by Khalidi et al.; published 2014 (Year: 2014).*

(Continued)

*Primary Examiner* — Vu V Tran
(74) *Attorney, Agent, or Firm* — Nixon & Vanderhye, P.C.

(57) ABSTRACT

A first electronic device according to various embodiments of the disclosure may include: a communication circuit, and at least one processor. The at least one processor may be configured to: receive, through the communication circuit, a first public key and a first request for a first symmetric key from a second electronic device, encrypt the first symmetric key using the first public key, transmit, through the communication circuit, the encrypted first symmetric key to the second electronic device, generate at least one second symmetric key corresponding to at least one object, encrypt the at least one object using the generated at least one second symmetric key, encrypt each of the at least one second (Continued)

symmetric key using the first symmetric key, and transmit, through the communication circuit, the encrypted at least one object and the encrypted at least one second symmetric key to the second electronic device.

15 Claims, 21 Drawing Sheets

(56) References Cited

U.S. PATENT DOCUMENTS

| | | | |
|---|---|---|---|
| 2004/0030911 A1 | 2/2004 | Isozaki et al. | |
| 2004/0139026 A1 | 7/2004 | Harada et al. | |
| 2006/0048235 A1 | 3/2006 | Rose et al. | |
| 2013/0268762 A1* | 10/2013 | Armatis | H04L 63/045 |
| | | | 713/171 |
| 2013/0318357 A1 | 11/2013 | Abraham et al. | |
| 2016/0277933 A1 | 9/2016 | Moon | |
| 2016/0315918 A1* | 10/2016 | Pollet | H04L 63/08 |
| 2017/0302636 A1 | 10/2017 | Boynton et al. | |
| 2017/0339115 A1* | 11/2017 | Cho | H04W 12/062 |
| 2018/0054376 A1 | 2/2018 | Hershey et al. | |
| 2018/0109947 A1 | 4/2018 | Kim et al. | |
| 2019/0379655 A1 | 12/2019 | Todoroki et al. | |
| 2020/0067892 A1 | 2/2020 | Pollet et al. | |
| 2020/0186329 A1 | 6/2020 | Song et al. | |

FOREIGN PATENT DOCUMENTS

| | | |
|---|---|---|
| JP | 2019-197503 | 11/2019 |
| JP | 2019-213085 | 12/2019 |
| JP | 2020-150310 | 9/2020 |
| KR | 10-2003-0087951 | 11/2003 |
| KR | 10-2007-0046957 | 5/2007 |
| KR | 10-0898437 | 5/2009 |
| KR | 10-2012-0108663 | 10/2012 |
| KR | 10-2012-0128376 | 11/2012 |
| KR | 10-2015-0035971 | 4/2015 |
| KR | 10-2016-0028230 | 3/2016 |
| KR | 10-2017-0077003 | 7/2017 |
| KR | 10-2017-0129427 | 11/2017 |
| KR | 10-2018-0041532 | 4/2018 |
| KR | 10-2018-0099083 | 9/2018 |
| KR | 10-2021-0032755 | 3/2021 |

OTHER PUBLICATIONS

International Search Report and Written Opinion dated Mar. 8, 2022 in corresponding International Application No. PCT/KR2021/017841.

* cited by examiner

METHOD FOR PROVIDING ENCRYPTED OBJECT AND ELECTRONIC DEVICE FOR SUPPORTING THE SAME

CROSS-REFERENCE TO RELATED APPLICATIONS

This application is a continuation of International Application No. PCT/KR2021/017841 designating the United States, filed on Nov. 30, 2021, in the Korean Intellectual Property Receiving Office and claiming priority to Korean Patent Application No. 10-2020-0183723, filed on Dec. 24, 2020, in the Korean Intellectual Property Office, the disclosures of which are incorporated by reference herein in their entireties.

BACKGROUND

Field

The disclosure relates to a method for providing an encrypted object and an electronic device for supporting the same.

Description of Related Art

Data collected by an electronic device (for example, IoT device) may be transferred to another electronic device (for example, user terminal) through a server. During data transfer between the IoT device and the server or between the user terminal and the server, data that has undergone encryption may be transmitted through a transmission channel. If the transmission channel has an interval that is not encrypted, data may leak. For example, if encrypted data transmitted from the IoT device is transmitted to the server, and if an unencrypted interval exists within the server, an encryption key or data stored in the server may leak if the server is hacked.

In order to store user data (for example, camera image data or position information) in a server, the user data may be encrypted using a key extracted based on the user's password. In this case, the password has a low level of security because the user tends to use the same password at multiple places, and increased computing power may result in vulnerability to a brute force attack.

An identical secret key may be generated by each electronic device to transfer an encrypted message through a server. According to this scheme, if an application installed in a user terminal is initialized, or if the user terminal is replaced, the previous secret key may be deleted or may not exist. As a result, the previous encrypted message cannot be restored, and the previous encrypted message may thus be deleted.

SUMMARY

Embodiments of the disclosure may provide a method and an apparatus for implementing end-to-end encryption (E2EE) for security in a system including an IoT device.

According to various example embodiments of the disclosure, a first electronic device may include: a communication circuit and at least one processor. The at least one processor may be configured to: receive, through the communication circuit, a first public key and a first request for a first symmetric key from a second electronic device, encrypt the first symmetric key using the first public key, transmit, through the communication circuit, the encrypted first symmetric key to the second electronic device, generate at least one second symmetric key corresponding to at least one object, encrypt the at least one object using the generated at least one second symmetric key, encrypt each of the at least one second symmetric key using the first symmetric key, and transmit, through the communication circuit, the encrypted at least one object and the encrypted at least one second symmetric key to the second electronic device.

According to various example embodiments of the disclosure a second electronic device may include: a communication circuit and at least one processor. The at least one processor may be configured to: transmit, through the communication circuit, a first public key and a first request for a first symmetric key to a first electronic device, receive, through the communication circuit, the first symmetric key encrypted using the first public key from the first electronic device, decrypt the encrypted first symmetric key using a first secret key, transmit, through the communication circuit, a request for at least one object to the first electronic device, receive, through the communication circuit from the first electronic device, the at least one object encrypted using at least one second symmetric key, and the at least one second symmetric key encrypted using the first symmetric key, decrypt the encrypted at least one second symmetric key using the first symmetric key, and decrypt the encrypted at least one object using the at least one second symmetric key.

A method for providing an encrypted object by a first electronic device according to various example embodiments of the disclosure may include: receiving a first public key and a first request for a first symmetric key from a second electronic device; encrypting the first symmetric key using the first public key; transmitting the encrypted first symmetric key to the second electronic device; generating at least one second symmetric key corresponding to at least one object; encrypting the at least one object using the generated at least one second symmetric key; encrypting each of the at least one second symmetric key using the first symmetric key; and transmitting the encrypted at least one object and the encrypted at least one second symmetric key to the second electronic device.

A method for providing an encrypted object and an electronic device for supporting the same, according to various example embodiments of the disclosure, are advantageous in that, when privacy data stored in an IoT platform server is used in a user terminal, the user terminal is allowed to decrypt the data with the same key as the encryption key used by an IoT device in a state in which the encryption key used by the IoT device is not known to a server. Accordingly, end-to-end encryption may be implemented between the IoT device and the user terminal.

A method for providing an encrypted object and an electronic device for supporting the same, according to various example embodiments of the disclosure, are advantageous in that, even if a server is hacked, the hacker may be prevented and/or deterred from acquiring privacy information of a user generated by an IoT device.

A method for providing an encrypted object and an electronic device for supporting the same, according to various example embodiments of the disclosure, are advantageous in that, instead of requiring the user to enter the password every time, a unique encryption key known only to a terminal and an IoT device may be used.

A method for providing an encrypted object and an electronic device for supporting the same, according to various example embodiments of the disclosure, are advantageous in that, even when a single person uses multiple terminals or devices, end-to-end encryption may be possible between an IoT device and multiple terminals.

A method for providing an encrypted object and an electronic device for supporting the same, according to various example embodiments of the disclosure, are advantageous in that, even after an application or an IoT device is initialized, an encryption key may be restored and used in a safe manner.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
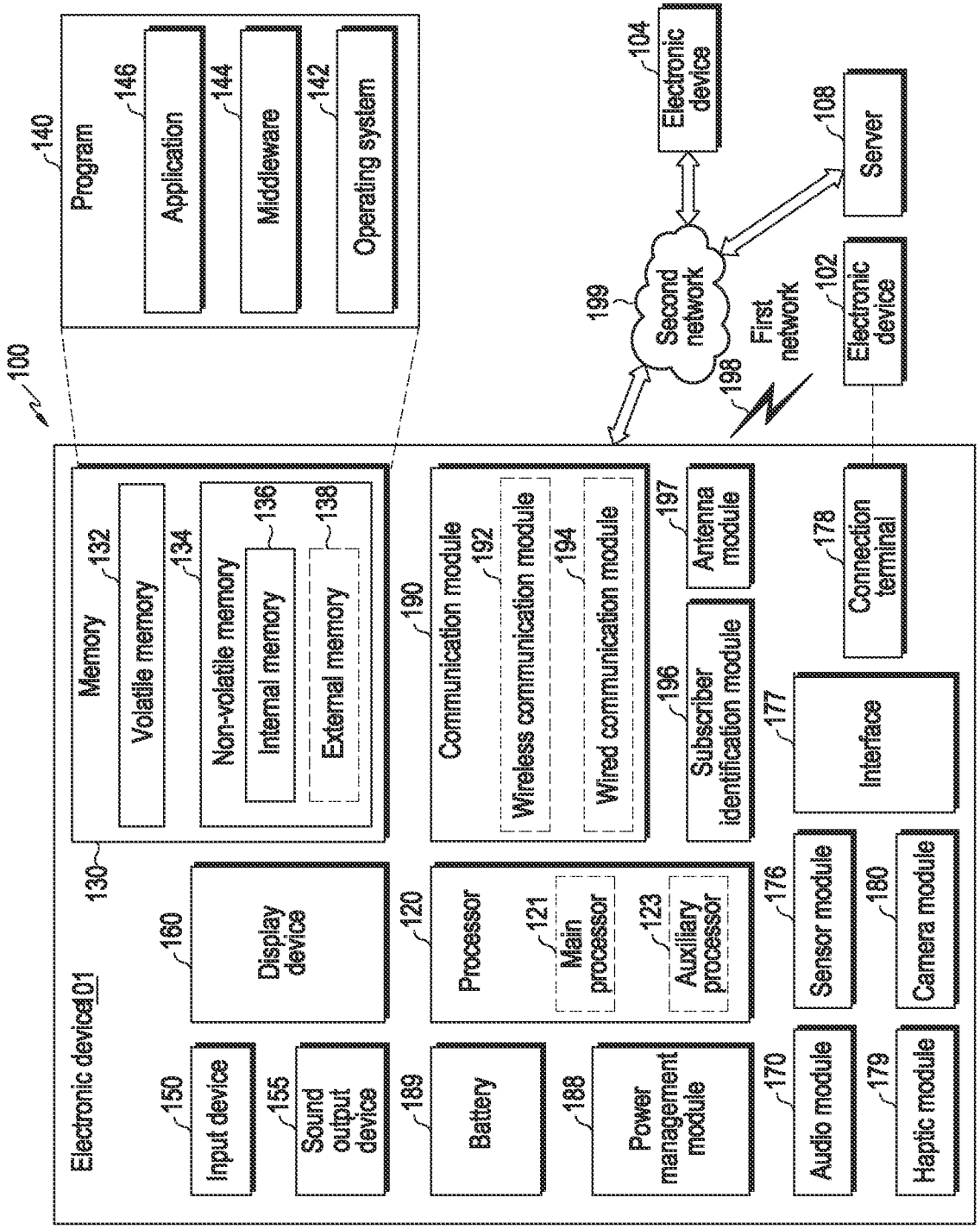
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
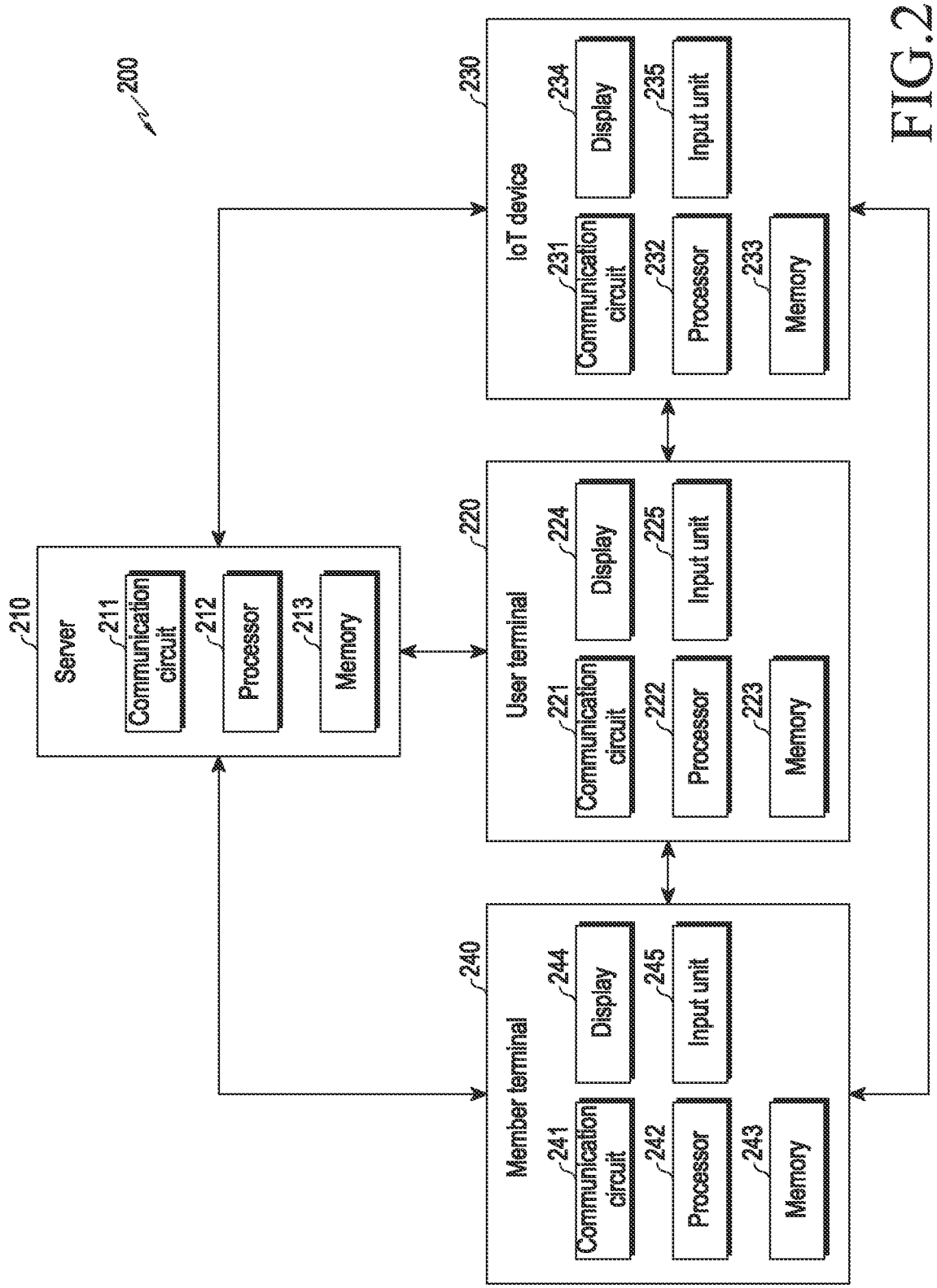
FIG. 2 is a block diagram illustrating an example configuration of a content providing system according to various embodiments.

FIG. 2 is a block diagram 200 illustrating an example configuration of a content providing system according to various embodiments. Referring to FIG. 2, the system 200 may include a server 210, a user terminal 220, an IoT device 230, and a member terminal 240. Each of the server 210, the user terminal 220, the IoT device 230, and the member terminal 240 may be referred to as an electronic device, and the function thereof is not limited to a particular function due to the name. In FIG. 2, the one server 210, the one user terminal 220, the one IoT device 230, and the one member terminal 240 are illustrated, but the number of network entities is not limited to one in various embodiments of the disclosure.

According to various embodiments of the disclosure, the server 210 may be referred to as a cloud, a first electronic device, or a second electronic device. Referring to FIG. 2, the server 210 may include a communication circuit 211, at least one processor (e.g., including processing circuitry) 212, and a memory 213. The server 210 may communicate with each of the user terminal 220, the IoT device 230, and the member terminal 240 through the communication circuit 211. The at least one processor 212 may include various processing circuitry and perform various operations according to various embodiments of the disclosure. The memory 213 may store information according to various embodiments of the disclosure. The memory 213 may be referred to as a secure storage or a database (DB).

In FIG. 2, the communication circuit 211, the at least one processor 212, and the memory 213 in the server 210 are included in separate blocks, respectively, and individual blocks are described to perform different functions. However, this description is merely for convenience of description, and does not necessarily require that the functions are separated as described above. According to various embodiments of the disclosure, the server 210 may further include a block performing another function. One or more blocks may be omitted from among the blocks illustrated in FIG. 2. In an embodiment, the server 210 may further include the input module 150 that receives an input from a user.

According to various embodiments of the disclosure, the server 210 may include physically or logically distinguishable multiple servers. In an embodiment, the server 210 may include a key management server, a device management (configuration) server, or an authority management server. In an embodiment, each of the key management server, the device management server, or the authority management server may include the communication circuit 211, the at least one processor 212, and the memory 213.

According to various embodiments of the disclosure, the user terminal 220 may be referred to as a terminal or a second electronic device. Referring to FIG. 2, the user terminal 220 may include a communication circuit 221, at least one processor (e.g., including processing circuitry) 222, a memory 223, a display 224, and an input unit (e.g., including input circuitry) 225. In an embodiment, the user terminal 220 may communicate with each of the server 210, the IoT device 230, and the member terminal 240 through the communication circuit 221. The at least one processor 222 may include various processing circuitry and perform various operations according to various embodiments of the disclosure. The memory 223 may store information according to various embodiments of the disclosure. The memory 223 may be referred to as a secure storage or a database (DB).

In FIG. 2, the communication circuit 221, the at least one processor 222, the memory 223, the display 224, and the input unit 225 in the user terminal 220 are included in separate blocks, respectively, and individual blocks are described to perform different functions. However, this description is merely for convenience of description, and does not necessarily require that the functions are separated as described above. According to various embodiments of the disclosure, the user terminal 220 may further include a block performing another function. One or more blocks may be omitted from among the blocks illustrated in FIG. 2. In an embodiment, the display 224 may include the input unit 225. In an embodiment, the user terminal 220 may further include the sensor module 176 and/or the camera module 180.

According to various embodiments of the disclosure, the IoT device 230 may be referred to as a device or a first electronic device. Referring to FIG. 2, the IoT device 230 may include a communication circuit 231, at least one processor (e.g., including processing circuitry) 232, a memory 233, a display 234, and an input unit (e.g., including input circuitry) 235. In an embodiment, the IoT device 230 may communicate with each of the server 210, the user terminal 220, and the member terminal 240 through the communication circuit 231. The at least one processor 232 may include various processing circuitry and perform various operations according to various embodiments of the disclosure. The memory 233 may store information according to various embodiments of the disclosure. The memory 233 may be referred to as a secure storage or a database (DB).

In FIG. 2, the communication circuit 231, the at least one processor 232, the memory 233, the display 234, and the input unit 235 in the IoT device 230 are included in separate blocks, respectively, and individual blocks are described to perform different functions. However, this description is merely for convenience of description, and does not necessarily require that the functions are separated as described above. According to various embodiments of the disclosure, the IoT device 230 may further include a block performing another function. One or more blocks may be omitted from among the blocks illustrated in FIG. 2. In an embodiment, the display 234 may include the input unit 235. In an embodiment, the IoT device 230 may further include the sensor module 176 and/or the camera module 180.

According to various embodiments of the disclosure, the member terminal 240 may be referred to as a terminal or a third electronic device. Referring to FIG. 2, the member terminal 240 may include a communication circuit 241, at least one processor (e.g., including processing circuitry) 242, a memory 243, a display 244, and an input unit (e.g., including input circuitry) 245. In an embodiment, the terminal 240 may communicate with each of the server 210, the user terminal 220, and the IoT device 230 through the communication circuit 241. The at least one processor 242 may include various processing circuitry and perform various operations according to various embodiments of the disclosure. The memory 243 may store information according to various embodiments of the disclosure. The memory 243 may be referred to as a secure storage or a database (DB).

In FIG. 2, the communication circuit 241, the at least one processor 242, the memory 243, the display 244, and the input unit 245 in the member terminal 240 are included in separate blocks, respectively, and individual blocks are described to perform different functions. However, this description is merely for convenience of description, and does not necessarily require that the functions are separated as described above. According to various embodiments of the disclosure, the member terminal 240 may further include a block performing another function. One or more blocks may be omitted from among the blocks illustrated in FIG. 2. In an embodiment, the display 244 may include the input unit 245. In an embodiment, the member terminal 240 may further include the sensor module 176 and/or the camera module 180.

According to various embodiments, the same electronic device may be operated as the user terminal 220 or the IoT device 230 according to the role thereof. For example, a smart phone including a camera sensor may be operated as the user terminal 220 that receives encrypted image data from the IoT device 230, and may be operated as the IoT device 230 that generates and image data using the camera sensor, and encrypts the generated image data.

Hereinafter, in various embodiments, data or content generated and encrypted by the IoT device 230 may be referred to as an object. An object according to various embodiments of the disclosure may include privacy-related information, such as data, content, an image clip, a video clip, or location information. According to various embodiments, in a case where the object is image data, a unit of object encryption may be a frame, a video clip, or a video clip fragment, but the disclosure is not limited thereto. In the following description, content may correspond to one or two more objects. A data encryption key (DEK) according to various embodiments of the disclosure may include a content key capable of encrypting or decrypting data or content, and the following various embodiments are not limited to the term. A key encryption key (KEK) according to various embodiments of the disclosure may be a secret key capable of encrypting or decrypting a DEK, and the following various embodiments are not limited to the term. In a case of using a symmetric key according to various embodiments of the disclosure, the same key may be used for encryption and decryption. In a case of using an asymmetric key according to various embodiments of the disclosure, a public key may be used for encryption, and a secret key may be used for decryption. In a case of using an asymmetric key according to various embodiments of the disclosure, a shared secret value generated through exchange of a public key between a terminal and a device, or a shared secret key derived from the shared secret may be used for encryption. The shared secret value according to various embodiments of the disclosure may be a value generated using an elliptic-curve Diffie-Hellman (ECDH) algorithm. The shared secret key according to various embodiments of the disclosure may be a value obtained as a result of including at least one of a user identification (ID), a terminal ID, or a device ID in the shared secret value, and performing a hash or key derivation function (KDF).

A digital signature (hereinafter, referred to as a signature) according to various embodiments of the disclosure may indicate an electronic signature using an asymmetric key. A certificate (certification) according to various embodiments of the disclosure may include a certificate chain (a certification chain).

A request and/or command according to various embodiments of the disclosure may be explicitly or implicitly transmitted. In an embodiment, in a case of explicitly transmitting a request and/or command, a field or bit map indicating the request and/or command may be transmitted. In an embodiment, in a case of implicitly transmitting a request and/or command, only information or data required to be carried with the request and/or command may be transmitted, but the disclosure is not limited thereto.

An application according to various embodiments disclosed herein may be referred to as an App, an APP, or an application. A public key or a secret key A user terminal (or a device) according to various embodiments disclosed therein may indicate a public key or a secret key of a particular app installed in the user terminal (or the device). A public key or a secret key of a particular app according to various embodiments disclosed therein may include a public key or a secret key generated by the particular app. A public key or a secret key of a particular app according to various embodiments disclosed therein may include a unique public key or secret key of a user terminal (or a device), which is injected during a process of producing the user terminal.

A user according to various embodiments of the disclosure may indicate an owner of a user terminal and/or an IoT device. A member disclosed herein may indicate an owner of a member terminal. A user ID or a member ID according to various embodiments disclosed herein may be used as an identifier for identifying a user or a member, respectively. A user ID according to various embodiments disclosed herein may be called an owner ID. A terminal ID or a device ID according to various embodiments disclosed herein may be used as an identifier for identifying a terminal or a device, respectively.

Figure 3:
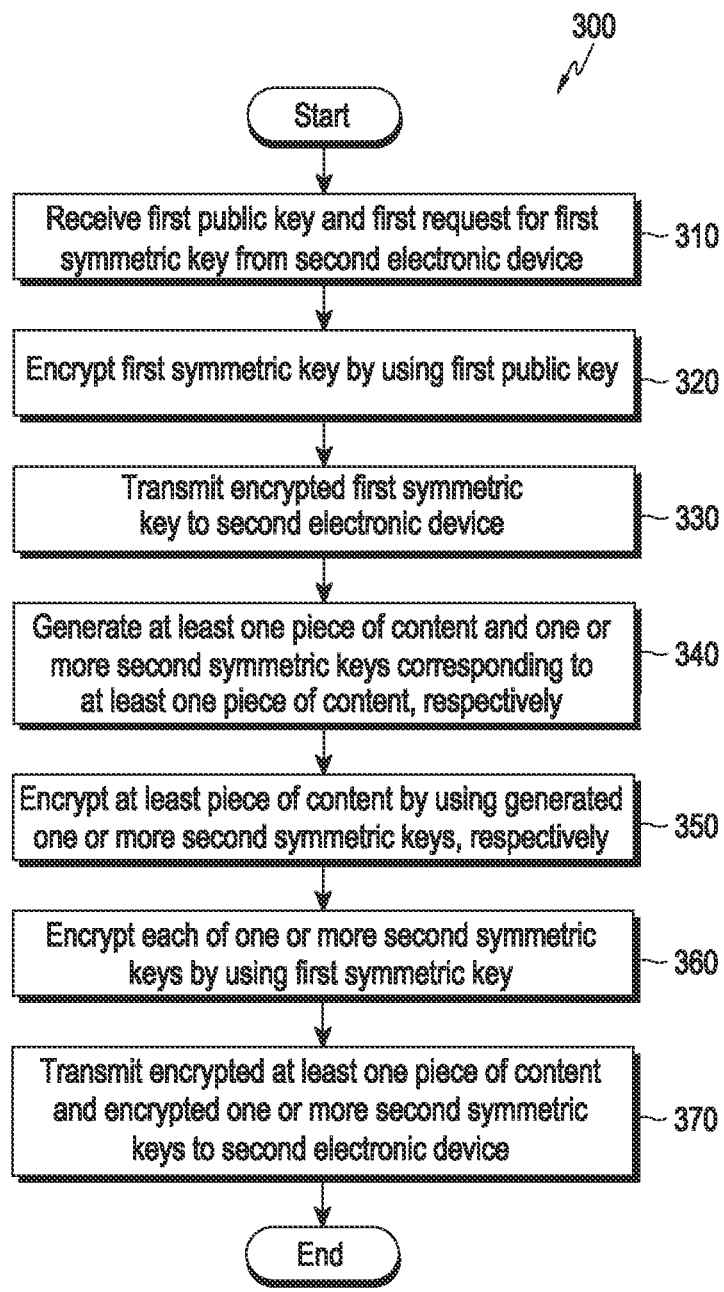
FIG. 3 is a flowchart illustrating an example operation of a first electronic device according to various embodiments.

FIG. 3 is a flowchart 300 illustrating an example operation of a first electronic device according to various embodiments.

In an embodiment, the first electronic device may be the IoT device 230 illustrated in FIG. 2. In an embodiment, the first electronic device may include the communication circuit 231 and the at least one processor 232.

In an embodiment, in operation 310, the at least one processor 232 of the first electronic device (e.g., the IoT device 230 in FIG. 2) may receive, through the communication circuit 231, a first public key and a first request for a first symmetric key, which are transmitted from a second electronic device (e.g., the server 210 or the user terminal 220 in FIG. 2). For example, the IoT device 230 illustrated in FIG. 2 may directly receive the first public key and the first request for the first symmetric key, which are transmitted from the user terminal 220, or may receive same through the server 210. According to various embodiments, the at least one processor 232 may receive a first certificate from the second electronic device through the communication circuit 231. In an embodiment, the first certificate may include the first public key. In an embodiment, the first certificate may not include the first public key. In an embodiment, the first certificate may include integrity information of the second electronic device. In an embodiment, the second electronic device may be the server 210 or the user terminal 220. In an embodiment, the first symmetric key may include a key encryption key (KEK). In an embodiment, the first certificate may include a certificate chain. In an embodiment, the first public key may be a unique key injected during a process of producing the second electronic device, or may be generated in an app of the second electronic device. In an embodiment, the at least one processor 232 may further receive, through the communication circuit 231, at least one of a user ID, a terminal ID, a device ID, a one-time arbitrary number, and a signature. In an embodiment, the at least one processor 232 may check the first certificate received from the second electronic device, and/or may check the signature. In an embodiment, the checking of the signature may be performed using the first public key. In an embodiment, the at least one processor 232 may determine whether the first public key has been generated in the user terminal 220, through the checking of the first certificate and/or the checking of the signature. In an embodiment, the at least one processor 232 may determine that the second electronic device has not been falsified, when the first certificate including integrity information of the second electronic device is received.

In an embodiment, in operation 320, the at least one processor 232 may encrypt the first symmetric key using the first public key. In an embodiment, the first symmetric key may be encrypted using a shared secret generated through a calculation between the first public key and a secret key of the first electronic device, or a shared secret key derived from the shared secret. In an embodiment, encryption of the first symmetric key may be performed when checking of the first certificate and/or check of the signature is successfully completed.

In an embodiment, in operation 330, the at least one processor 232 may transmit the encrypted first symmetric key to the second electronic device through the communication circuit 231.

In an embodiment, in operation 340, the at least one processor 232 may generate at least one object (e.g., piece of content) and at least one second symmetric key corresponding to the at least one object, respectively. In an embodiment, the at least one second symmetric key may include a DEK. In an embodiment, in operation 350, the at least one processor 232 may encrypt the at least one object (e.g., piece of content) using the generated at least one second symmetric key, respectively. In an embodiment, in operation 360, the at least one processor 232 may encrypt each of the at least one second symmetric key using the first symmetric key. In an embodiment, in operation 370, the at least one processor 232 may transmit, through the communication circuit 231 and to the second electronic device, the at least one object encrypted using the second symmetric key, and the at least one second symmetric key encrypted using the first symmetric key. In an embodiment, the at least one processor 232 may encrypt a public key of the first electronic device to the second electronic device. In an embodiment, the at least one processor 232 may store the public key of the first electronic device in a server (e.g., a key server).

Figure 4:
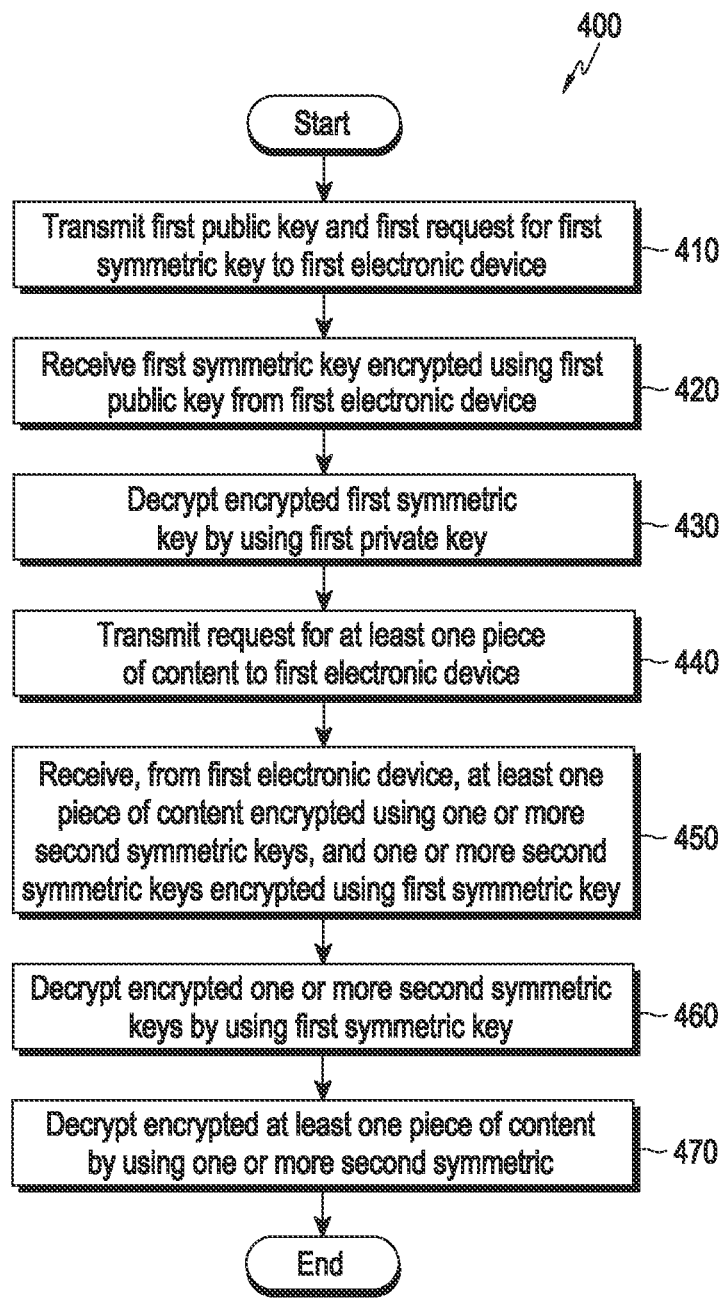
FIG. 4 is a flowchart illustrating an example operation of a second electronic device according to various embodiments.

FIG. 4 is a flowchart 400 illustrating an example operation of a second electronic device according to various embodiments.

In an embodiment, the second electronic device may be the user terminal 220 illustrated in FIG. 2. In an embodiment, the second electronic device may include the communication circuit 221 and the at least one processor 222.

In an embodiment, in operation 410, the at least one processor 222 may transmit a first public key and a first request for a first symmetric key to a first electronic device through the communication circuit 221. In an embodiment, the first electronic device may be the server 210 or the IoT device 230 illustrated in FIG. 2. In an embodiment, the first symmetric key may include a key encryption key (KEK). In an embodiment, the at least one processor 222 may transmit a first certificate from the first electronic device through the communication circuit 231. In an embodiment, the first certificate may include the first public key. In an embodiment, the first certificate may not include the first public key. In an embodiment, the first certificate may include a certificate chain. In an embodiment, the certificate chain may include integrity information of the second electronic device. In an embodiment, the first public key may be unique keys of the second electronic device, or may be generated in a particular app of the second electronic device. In an embodiment, the at least one processor 232 may further transmit, through the communication circuit 231, at least one of a user ID, a terminal ID, a device ID, a one-time random number, and a signature.

In an embodiment, in operation 420, the at least one processor 222 may receive, through the communication circuit 221, the first symmetric key encrypted using the first public key transmitted from the first electronic device. In an embodiment, the at least one processor 222 may receive a public key of the first electronic device from the first electronic device. In an embodiment, the public key of the first electronic device may be received through a server (e.g., a key server). In an embodiment, in operation 430, the at least one processor may decrypt the encrypted first symmetric key using a first secret (e.g., private) key. In an embodiment, the at least one processor 222 may encrypt the encrypted first symmetric key using a shared secret generated through a calculation between the transferred device public key and the first secret key, or a shared secret key derived from the shared secret.

In an embodiment, in operation 440, the at least one processor 222 may transmit a request for at least one object (e.g., piece of content) to the first electronic device (e.g., the server 210 or the IoT device 230 in FIG. 2) through the communication circuit 221. In an embodiment, in operation 450, the at least one processor 222 may receive, through the communication circuit 221 and from the first electronic device, the at least one object (e.g., piece of content) encrypted using at least one second symmetric key, and the at least one second symmetric key encrypted using the first symmetric key. In an embodiment, the at least one second symmetric key may include a data encryption key (DEK). In an embodiment, in operation 460, the at least one processor 222 may decrypt the encrypted at least one second symmetric key using the first symmetric key. In an embodiment, in operation 470, the at least one processor 222 may decrypt the encrypted at least one object using the at least one second symmetric key.

Figure 5:
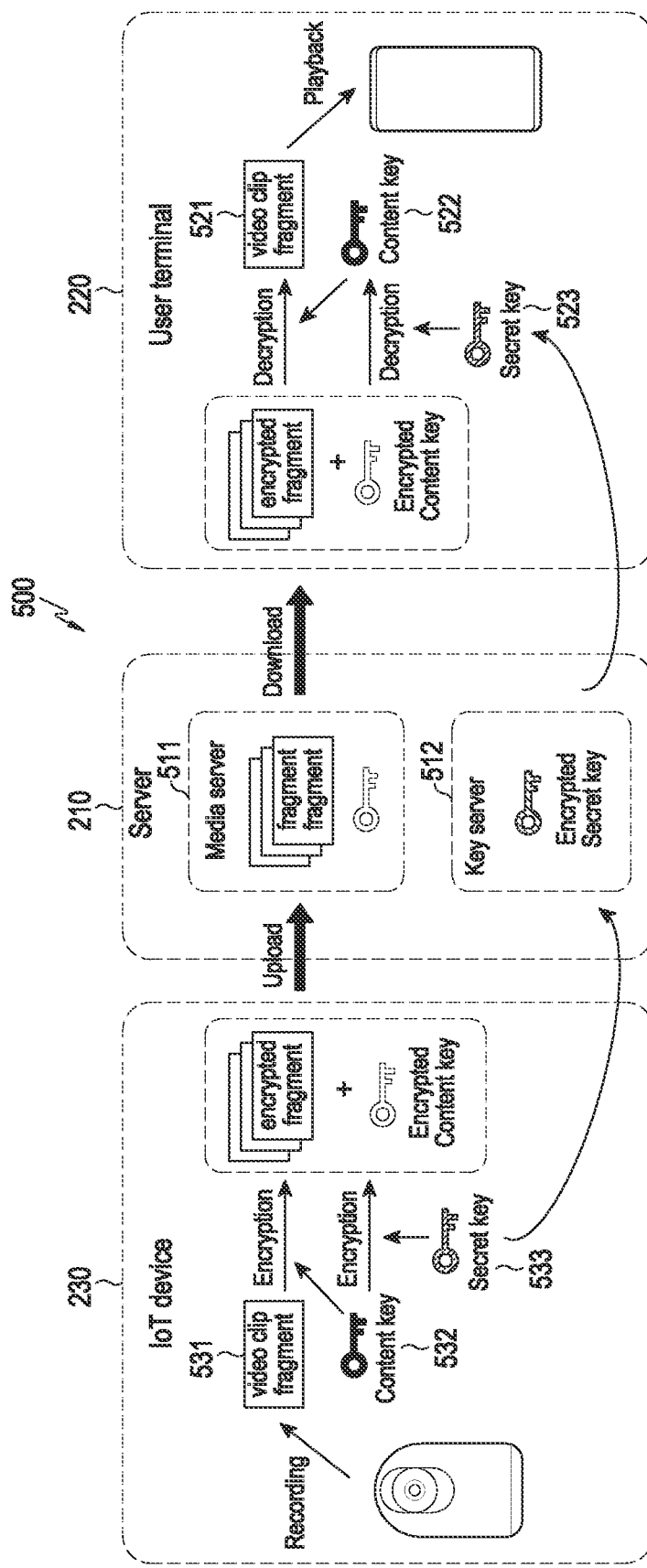
FIG. 5 is a diagram illustrating a system for clip generation and reproduction according to various embodiments.

FIG. 5 is a diagram illustrating a system 500 for clip generation and reproduction according to various embodiments.

In an embodiment, the at least one processor 232 of the IoT device 230 may newly generate a corresponding content key 532 every time a video clip is newly generated. In an embodiment, the video clip may include at least one video clip fragment 531. According to an embodiment, the at least one processor 232 may newly generate the corresponding content key 532 every time a video clip fragment is newly generated. In FIG. 5, an example of a unit of encryption using the content key 532 is described to be a video clip or a video clip fragment, but various embodiments are not limited thereto. Furthermore, any types of encryptable unit objects may be substituted for the video clip or video clip fragment.

In an embodiment, the content key 532 corresponding to at least one video clip fragment included in one video clip may be all the same, but the disclosure is not limited thereto. In an embodiment, the at least one processor 232 may encrypt each video clip fragment 531 using the corresponding content key 532. In an embodiment, the at least one processor 232 may encrypt the corresponding content key 532 using a predetermined secret key 533. In an embodiment, the at least one processor 232 may upload, through the communication circuit 231 and in the server 210, each of at least one encrypted video clip and at least one encrypted corresponding content key in a pair type. In an embodiment, the at least one processor 232 may encrypt the predetermined secret key 533 using a unique key of the IoT device 230, and transmit the encrypted predetermined secret key 533 to the server 210 through the communication circuit 231.

In an embodiment, uploading of the pair may be performed every time a video clip is generated and encrypted. In an embodiment, in response to the IoT device 230 and the server 210 being connected to each other by a predetermined communication scheme (e.g., Wi-Fi or 5G) after video clip generation and encryption, the at least one processor 232 may upload the pair through the communication circuit 231. In an embodiment, in response to sensing of a user's particular input by an input unit of the IoT device 230 after video clip generation and encryption, the at least one processor 232 may upload the pair through the communication circuit 231.

In an embodiment, the server 210 may include a media server 511 and a key server 512. In an embodiment, the media server 511 may be referred to as a content server. In an embodiment, the media server 511 may store, in the memory 213, each of at least one encrypted video clip and at least one encrypted corresponding content key in a pair type. In an embodiment, the key server 512 may store the encrypted predetermined secret key in the memory 213.

In an embodiment, the at least one processor 222 of the user terminal 220 may download, through the communication circuit 221 and from the server 210, each of at least one encrypted video clip and at least one encrypted corresponding content key in a pair type. In an embodiment, the downloading may be performed every time each pair is uploaded from the IoT device 230 to the server 210. In an embodiment, in response to the user terminal 220 and the server 210 being connected to each other by a particular communication scheme (e.g., Wi-Fi or 5G) after each of the encrypted video clip and the at least one encrypted corresponding content key are stored in a storage of the server 210, the at least one processor 222 may upload the pair through the communication circuit 221. In an embodiment, in response to sensing or receiving a user's particular input (e.g., a request to download a video clip) by the input unit 225 of the user terminal 220 after each of the encrypted video clip and the at least one encrypted corresponding content key are stored in the memory 213 of the server 210, the at least one processor 222 may upload the pair through the communication circuit 221.

In an embodiment, the at least one processor 222 of a second electronic device (e.g., the user terminal 220) may receive the encrypted predetermined secret key from the server 210 through the communication circuit 221. In an embodiment, the at least one processor 222 may decrypt the encrypted predetermined secret key using the unique key of the IoT device 230.

In an embodiment, the at least one processor 222 may decrypt the encrypted content key downloaded from the server 210 using the decrypted predetermined secret key 523. In an embodiment, the at least one processor 222 may decrypt the encrypted video clip using a decrypted content key 522 corresponding to the encrypted video clip. In an embodiment, the at least one processor 222 may reproduce the decrypted video clip 521 and display same through the display 224.

Figure 6:
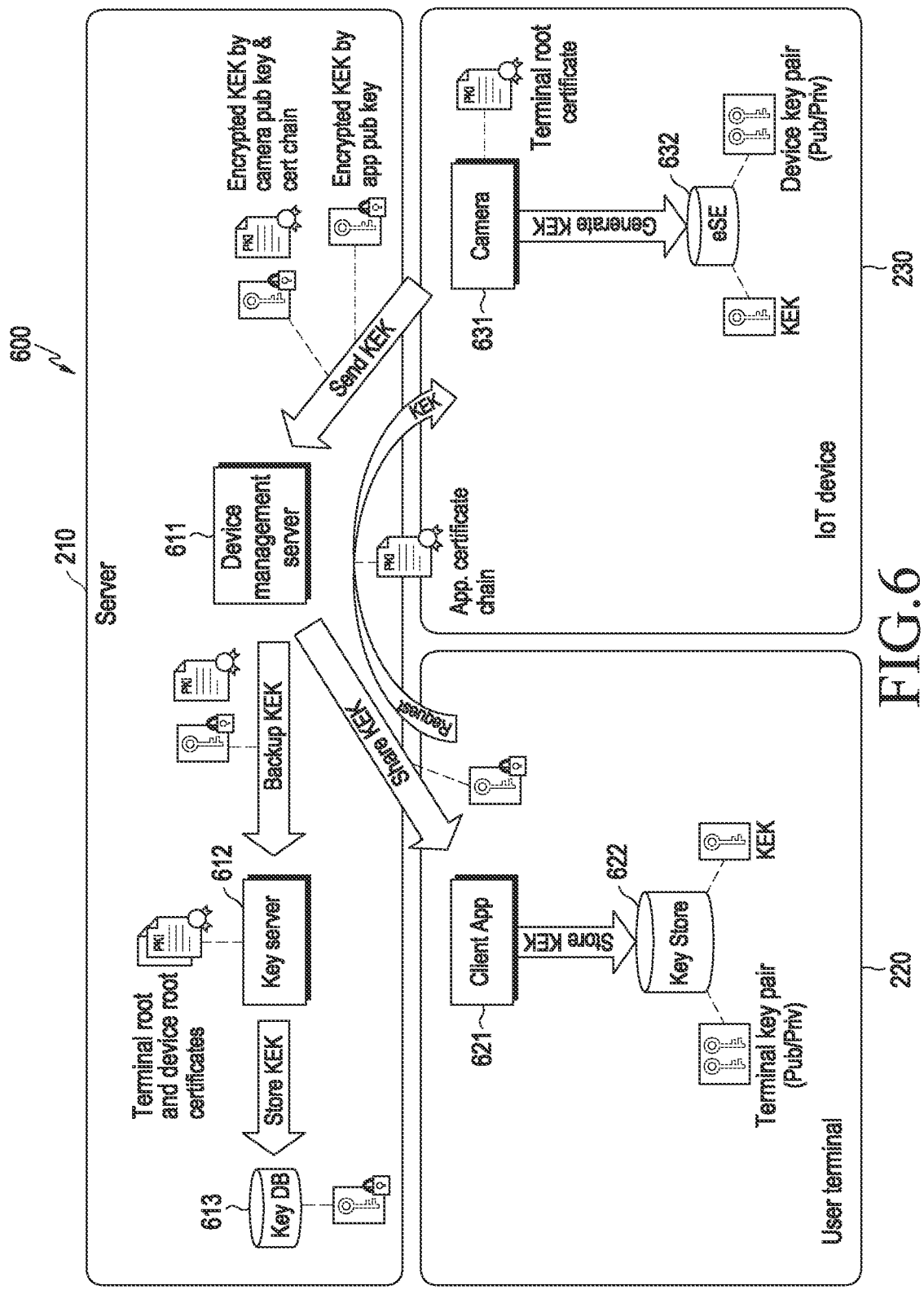
FIG. 6 is a diagram illustrating a system for KEK generation and management according to various embodiments.

FIG. 6 is a diagram illustrating a system 600 for KEK generation and management according to various embodiments.

In an embodiment, the at least one processor 232 in the IoT device 230 may check integrity of the IoT device 230. In an embodiment, when integrity checking of the IoT device 230 is passed, the at least one processor 232 may obtain a certificate chain. In an embodiment, the at least one processor 232 may generate a KEK through a camera module 631, and store the generated KEK in the memory 233. In an embodiment, when integrity checking of the IoT device 230 is not passed, the at least one processor 232 may not generate the KEK. In an embodiment, the memory 233 may include an eSE 632 (e.g., a secure storage). In an embodiment, the memory 233 may include a secured storage based on a trusted execution environment. In an embodiment, the at least one processor 232 may store a key pair (a public key and a secret key) of the camera module 631 in the memory 233. In an embodiment, the at least one processor 232 may encrypt the KEK using a third symmetric key or a unique public key of the IoT device 230. In an embodiment, the at least one processor 232 may sign for the encrypted KEK. In an embodiment, the at least one processor 232 may transmit the encrypted KEK and/or the certificate chain to a device management server 611. In an embodiment, the encrypted KEK may be transmitted together with a request to store the KEK, and at least one identifier corresponding to the request to store. In an embodiment, the at least one identifier may include a user ID and/or a device ID.

In an embodiment, the device management server 611 and/or a key server 612 in the server 210 may include at least one processor (e.g., the processor 212 in FIG. 2). In an embodiment, the device management server 611 may request the key server 612 to back up the KEK. In an embodiment, when the key server 612 receives a request to back up the KEK from the device management server, the key server may check the certificate chain using a root certificate of the IoT device 230. In an embodiment, the key server 612 may check a signature of the IoT device 230. In an embodiment, the key server 612 may check integrity of the IoT device 230. In an embodiment, when checking of the certificate chain, checking of the signature, and/or checking of the integrity is passed, the key server 612 may store the encrypted KEK in a key database 613. In an embodiment, the memory 213 may include the key database 613.

In an embodiment, the at least one processor 222 of the user terminal 220 may receive a KEK through the communication circuit 221 in response to a KEK request to the IoT device 230, so that the KEK is shared. In an embodiment, when a client application 621 in the user terminal 220 receives the KEK from the device management server 611, the at least one processor 222 may store the KEK in a key storage 622. In an embodiment, the memory 223 may include the key storage 622. In an embodiment, the key storage 622 may store a key pair (a public key and a secret key) of the user terminal 220 in which the client application 621 is installed.

In an embodiment, the at least one processor 232 of the IoT device 230 may transmit, to the server 210, a request for a KEK and at least one identifier corresponding to the request through the communication circuit 231. In an embodiment, the at least one identifier may include a user ID and/or a device ID. In an embodiment, the at least one processor 232 may receive an encrypted KEK from the server 210 through the communication circuit 231. In an embodiment, the at least one processor 232 may decrypt the encrypted KEK using a secret key. In an embodiment, the secret key may correspond to a public key received from the server 210.

A first electronic device according to various example embodiments of the disclosure may include: a communication circuit, and at least one processor. The at least one processor may be configured to: receive, through the communication circuit, a first public key and a first request for a first symmetric key from a second electronic device, encrypt the first symmetric key using the first public key, transmit, through the communication circuit, the encrypted first symmetric key to the second electronic device, generate at least one object and at least one second symmetric key corresponding to the at least one object, encrypt the at least one object using the generated at least one second symmetric key, encrypt each of the at least one second symmetric key using the first symmetric key, and transmit, through the communication circuit, the encrypted at least one object and the encrypted at least one second symmetric key to the second electronic device.

The at least one processor of the first electronic device according to various example embodiments of the disclosure may be configured to: receive, through the communication circuit, a first certificate and a signature, check the first certificate, check the signature using the first public key, and based on the checking of the first certificate and the checking of the signature being successfully passed, encrypt the first symmetric key using the first public key.

The at least one processor of the first electronic device according to various example embodiments of the disclosure may be configured to: randomly generate the first symmetric key, encrypt the first symmetric key using a third symmetric key or a device unique public key, and transmit, through the communication circuit and to the second electronic device, a request to store the first symmetric key, at least one identifier corresponding to the request to store, and the first symmetric key encrypted using the third symmetric key or the device unique public key.

The at least one processor of the first electronic device according to various example embodiments of the disclosure may be configured to: transmit, through the communication circuit, a second request for the first symmetric key and at least one identifier corresponding to the second request to the second electronic device, receive, through the communication circuit, the encrypted first symmetric key from the second electronic device, and decrypt the encrypted first symmetric key using a first secret key.

The at least one processor of the first electronic device according to various example embodiments of the disclosure may be configured to: receive, through the communication circuit, a request to change an encryption configuration, at least one identifier corresponding to the request to change, a configuration value, and a signature from the second electronic device, and based on checking of the signature being successfully passed using a second public key of the second electronic device, change the encryption configuration based on the configuration value.

The at least one processor of the first electronic device according to various example embodiments of the disclosure may be configured to: receive, through the communication circuit, a request to change a clip sharing configuration for a third electronic device, at least one identifier corresponding to the request to change, a configuration value, and a signature from the second electronic device, and based on checking of the signature being successfully passed using a second public key of the second electronic device, change the clip sharing configuration for the third electronic device based on the configuration value.

The at least one processor of the first electronic device according to various example embodiments of the disclosure may be configured to: receive, through the communication circuit, a request to share the first symmetric key with the second electronic device, at least one identifier corresponding to the request to share, a second certificate including a second public key, and a signature from the second electronic device, based on checking of the signature being successfully passed using a public key of the second electronic device, encrypt the first symmetric key using the second public key, and transmit the first symmetric key encrypted using the second public key to the second electronic device.

In various example embodiments of the disclosure, the first symmetric key encrypted using the second public key may be transmitted by the third electronic device capturing an image of a QR code displayed on the first electronic device, or the third electronic device using a UWB.

The at least one processor of the first electronic device according to various example embodiments of the disclosure may be configured to: receive, through the communication circuit, a request to replace the first symmetric key, at least one identifier corresponding to the request to replace, a second certificate including a second public key, and a signature from the second electronic device, based on checking of the signature being successfully passed using the second public key, generate a new first symmetric key, and encrypt each of the at least one second symmetric key using the new first symmetric key.

A second electronic device according to various example embodiments of the disclosure may include: a communication circuit, and at least one processor. The at least one processor may be configured to: transmit, through the communication circuit, a first public key and a first request for a first symmetric key to a first electronic device, receive, through the communication circuit, the first symmetric key encrypted using the first public key from the first electronic device, decrypt the encrypted first symmetric key using a first secret key, transmit, through the communication circuit, a request for at least one object to the first electronic device, receive, through the communication circuit and from the first electronic device, the at least one object encrypted using at least one second symmetric key, and the at least one second symmetric key encrypted using the first symmetric key, decrypt the encrypted at least one second symmetric key using the first symmetric key, and decrypt the encrypted at least one object using the at least one second symmetric key.

The at least one processor of the second electronic device according to various example embodiments of the disclosure may be configured to: obtain a second certificate through integrity checking of the second electronic device, and transmit, through the communication circuit, a request to register the second electronic device, the second certificate, and an identifier of the second electronic device to the first electronic device.

The at least one processor of the second electronic device according to various example embodiments of the disclosure may be configured to: receive, through the communication circuit, a request to share the first symmetric key with a third electronic device, at least one identifier corresponding to the request to share, a third certificate including a third public key, and a signature from the first electronic device, based on checking of the signature being successfully passed using a second public key of the second electronic device, encrypt the first symmetric key using the third public key, and transmit the first symmetric key encrypted using the third public key to the third electronic device.

In various example embodiments of the disclosure, the first symmetric key encrypted using the third public key may be transmitted by the third electronic device capturing an image of a QR code displayed on the second electronic device, or the third electronic device using a UWB.

Figure 7:
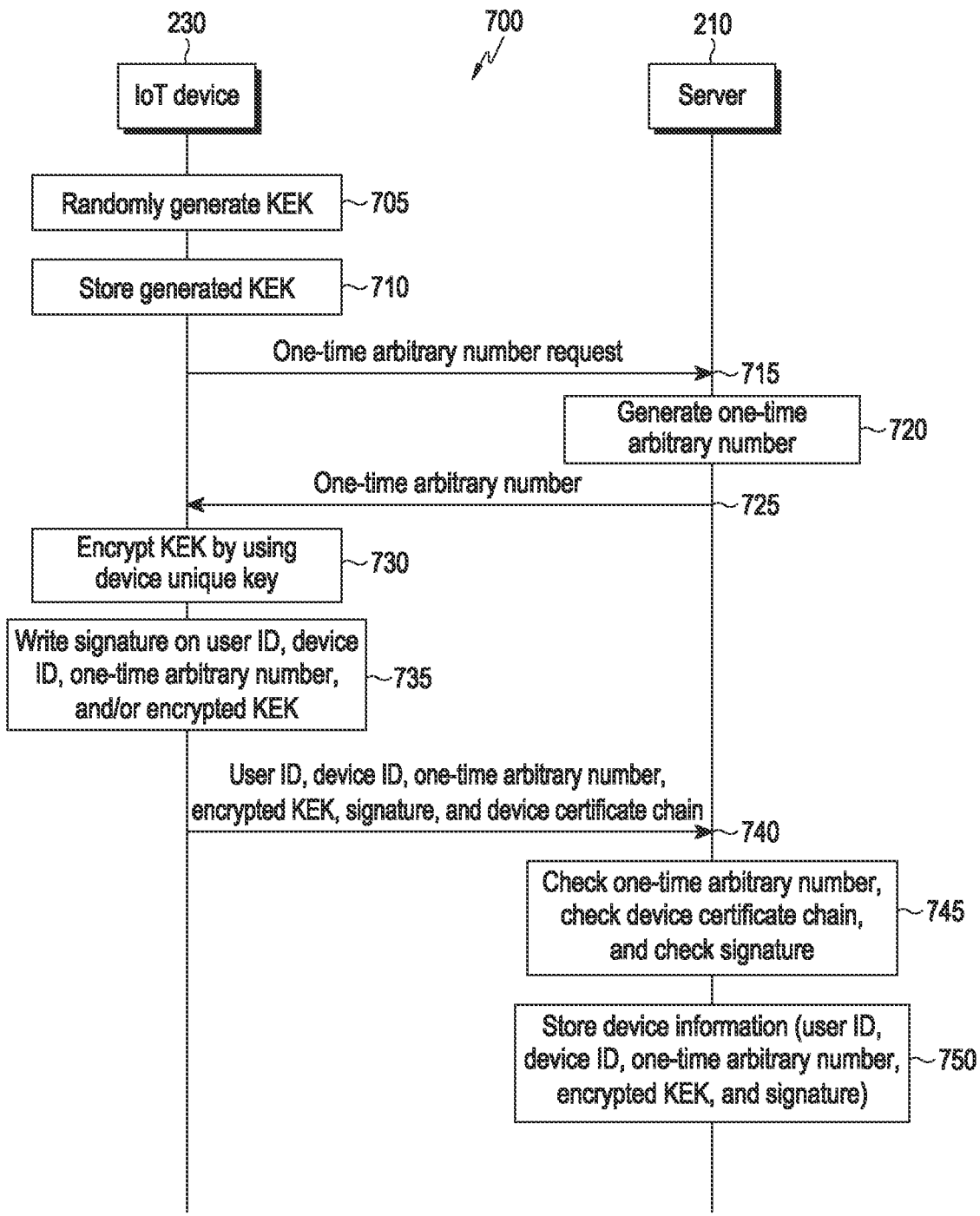
FIG. 7 is a signal flow diagram illustrating an example of KEK generation and backup in a content providing system according to various embodiments.

FIG. 7 is a signal flow diagram 700 illustrating an example of KEK generation and backup in the content providing system 200 according to various embodiments.

In an embodiment, the at least one processor 232 of an IoT device (e.g., the IoT device 230 in FIG. 2) may load, in the memory 233 (e.g., a hardware-based security module), a pair of a public key/secret key of a unique public key algorithm injected during a production process. In an embodiment, at the time of initial booting, the at least one processor 232 may generate a device symmetric key which can be kept even after device initialization, and store the generated device symmetric key in the memory 233 (e.g., a hardware-based security module). In an embodiment, when the IoT device 230 is registered as a used device by a particular app installed in the user terminal 220 or the IoT device 230, the at least one processor 232 may be registered in a server (e.g., a key management server) as a used device. In an embodiment, the IoT device 230 registered in the server 210 as a used device may receive a user ID of a device owner from the server 210 through the communication circuit 231. In an embodiment, the at least one processor 232 may apply a hash algorithm to the user ID, and then store, in the memory 233, the user ID to which the hash algorithm has been applied.

In an embodiment, in operation 705, the at least one processor 232 may randomly generate a KEK. In an embodiment, the random generation may include a cryptographic random generation. In an embodiment, in operation 710, the at least one processor 232 may store the generated KEK in the memory 233.

In an embodiment, the at least one processor 232 may back up the KEK in the memory 233 in order to enable reconstruction of the KEK even after the IoT device 230 is initialized. In an embodiment, in operation 715, the at least one processor 232 may request a one-time arbitrary number (nonce) from the server 210 (e.g., a key management server). In an embodiment, in operation 720, the server 210 may generate a one-time arbitrary number in response to the request. In an embodiment, the generated one-time arbitrary number may have a predetermined valid time (e.g., within 5 minutes). In an embodiment, in operation 725, the server 210 may transmit the generated one-time arbitrary number to the IoT device 230.

In an embodiment, in operation 730, the at least one processor 232 may encrypt the KEK using a device unique key. In an embodiment, the device unique key may be called a third symmetric key. In an embodiment, the device unique key may include a device unique public key of a public key algorithm. In an embodiment, in operation 735, the at least one processor 232 may write a signature on a user ID, a device ID, an encrypted KEK, and/or a one-time arbitrary number received from a key management server, using a device unique secret key. In an embodiment, the at least one processor 232 may obtain a certificate chain through integrity checking.

In an embodiment, in operation 740, the at least one processor 232 may transmit a KEK backup (storage) request to the server 210 through the communication circuit 231. In an embodiment, the transmission of the KEK backup request may include transmission of the user ID, the signature for the user ID, the device ID, the signature for the device ID, the one-time arbitrary number, the signature for the one-time arbitrary number, the encrypted KEK, the signature for the encrypted KEK, and/or a certificate chain of the IoT device 230. In an embodiment, the certificate chain may include a device unique public key of the IoT device 230.

In an embodiment, in operation 745, the server 210 may check each of the signed one-time arbitrary number, the certificate chain, and/or the signature, which are received from the IoT device 230. In an embodiment, the checking of the one-time arbitrary number may include checking whether the one-time arbitrary number has been used within 5 minutes after issued. In an embodiment, the checking of the signature may be performed using the device unique public key. In an embodiment, in operation 750, when the checking is passed, the server 210 may store, in the memory 213 (e.g., a database included in the key management server or connected to the key management server), the one-time arbitrary number, the user ID, the device ID, the encrypted KEK, and/or the signature as device information.

In an embodiment, in a case where the IoT device 230 has been removed from a used device of a particular app, or the IoT device 230 is installed again as a used device of the particular app after the IoT device 230 is initialized, the at least one processor 232 may transmit a KEK request to the server 210 (e.g., the key management server) through the communication circuit 231. In an embodiment, the transmission of the KEK request may include transmission of the user ID and/or the device ID. In an embodiment, the server 210 may transmit the encrypted KEK with the signature to the IoT device 230 in response to the transmission of the KEK request. In an embodiment, when the encrypted KEK is received by the IoT device 230 through the communication circuit 231, the at least one processor 232 may check the signature, and decrypt the encrypted KEK. According to the above operations, the KEK which has been previously backed up in the server 210 may be reconstructed in the IoT device 230. Therefore, in a situation where initialization of the IoT device 230 is performed frequently, the IoT device 230 can process data using the same encryption key regardless of whether device initialization has been performed, and can prevent and/or reduce an increase of the volume of a managed key.

Figure 8:
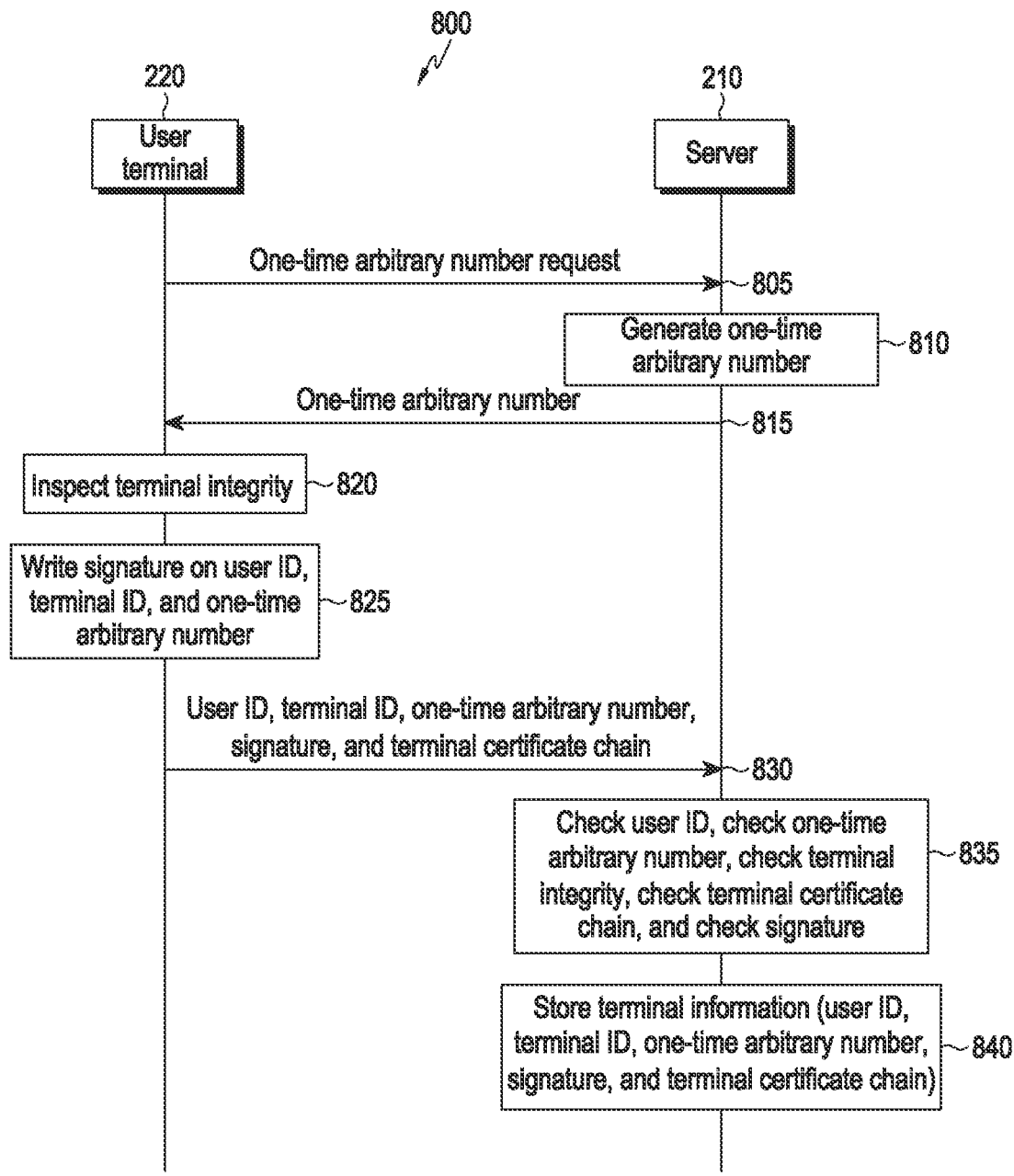
FIG. 8 is a signal flow diagram illustrating an example of registration of a user terminal in a content providing system according to various embodiments.

FIG. 8 is a signal flow diagram 800 illustrating an example of registration of the user terminal 220 in the content providing system 200 according to various embodiments.

In an embodiment, the server 210 having received an encryption configuration request or a clip sharing configuration request may perform an encryption configuration or a clip sharing configuration in a case where the user terminal 220, which is a requester, is registered in the server 210. In an embodiment, after the user terminal 220 is linked with a server (e.g., a key management server), in a case where a key pair generated in an app of the user terminal 220 is not stored in the memory 223 (e.g., a hardware-based secure key storage), the at least one processor 222 of the user terminal 220 may generate a pair of a public key/secret key. In FIG. 8, a user sends a request for server registration through the user terminal 220, the user may send a request for server registration through the IoT device 230 or the member terminal 240.

In an embodiment, in operation 805, the at least one processor 222 may request a one-time arbitrary number (nonce) from the server 210. In an embodiment, in operation 810, the server 210 having received the request may generate a one-time arbitrary number. In an embodiment, the generated one-time arbitrary number may have a predetermined valid time (e.g., within 5 minutes). In an embodiment, in operation 815, the server 210 may transmit the generated one-time arbitrary number to the user terminal 220.

In an embodiment, in order to identify whether the user terminal 220 is an official terminal, in operation 820, the at least one processor 222 may perform integrity checking of the user terminal 220. In an embodiment, the at least one processor 222 may request, using the one-time arbitrary number, an integrity verification module included in the user terminal 220 to perform integrity checking of the user terminal 220. In an embodiment, the integrity checking of the user terminal 220 may include checking of an origin of a user terminal key, a security level of authentication of a user terminal security module, and an integrity state of the user terminal 220. In an embodiment, when the checking of the integrity state is passed, the user terminal 220 may obtain a certificate chain (a terminal certificate chain) of the user terminal 220, which includes a result of the integrity checking. In an embodiment, even when the checking of the integrity state is not passed, the user terminal 220 may obtain a certificate chain (a terminal certificate chain) of the user terminal 220, which includes a result of the integrity checking.

In an embodiment, in operation 825, the at least one processor 222 may write a signature on a user ID, a terminal ID, and/or a one-time arbitrary number using a secret key generated by an app of the user terminal 220. In an embodiment, the signing may be performed using a secret key injected during a unique process of the user terminal 220 instead of the secret key generated by the app of the user terminal 220. In an embodiment, in a case where the one-time arbitrary number is already included in the certificate chain, the at least one processor 222 may not sign for the one-time arbitrary number.

In an embodiment, in operation 830, the at least one processor 222 may transmit a registration request to the server 210 (e.g., a key management server) through the communication circuit 221. The transmission of the registration request may include transmission of the user ID, the terminal ID, the one-time arbitrary number, the signature, and/or the certificate chain of the terminal. In an embodiment, in operation 835, the server 210 may check each of the user ID, the one-time arbitrary number, terminal integrity, the certificate chain, and/or the signature. In an embodiment, the checking of the terminal integrity may include checking of an origin of a user terminal key, a security level of authentication of a user terminal security module, and an integrity state of the user terminal 220. In an embodiment, the checking of the certificate chain may be performed using a root certificate stored in the memory 213 (e.g., a verification module) in the server 210. In an embodiment, in operation 840, if the checking of operation 835 is passed, the server 210 may register the user terminal 220. In an embodiment, the registering of the user terminal 220 may include storing the one-time arbitrary number, the user ID, the terminal ID, the signature, and/or the certificate chain in the memory 213 as terminal information.

In an embodiment, after the user terminal 220 is rebooted, every time a user accesses the app, operation 825 to operation 840 may be performed. In an embodiment, the at least one processor 222 may transfer a terminal state again to terminal the server 210 (e.g., the key management server) through the communication circuit 221. In an embodiment, if a terminal integrity checking fails in operation 835, the server 210 may remove the terminal information stored in the server 210. In an embodiment, a new terminal can be registered in the server 210 through operation 825 to operation 840.

Figure 9A:
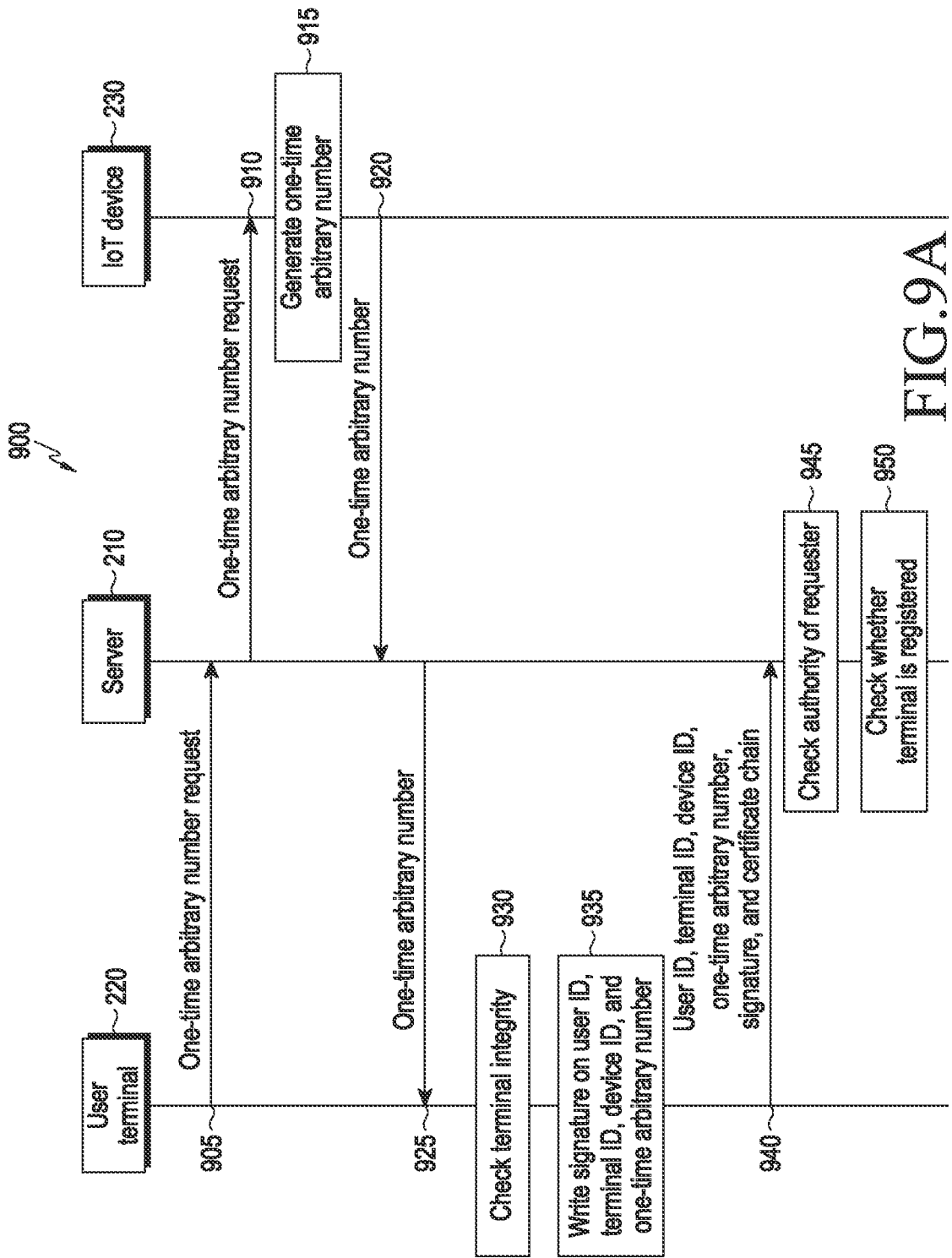
FIG. 9A and FIG. 9B are signal flow diagrams illustrating an example of KEK sharing in a content providing system according to various embodiments.
Figure 9B:
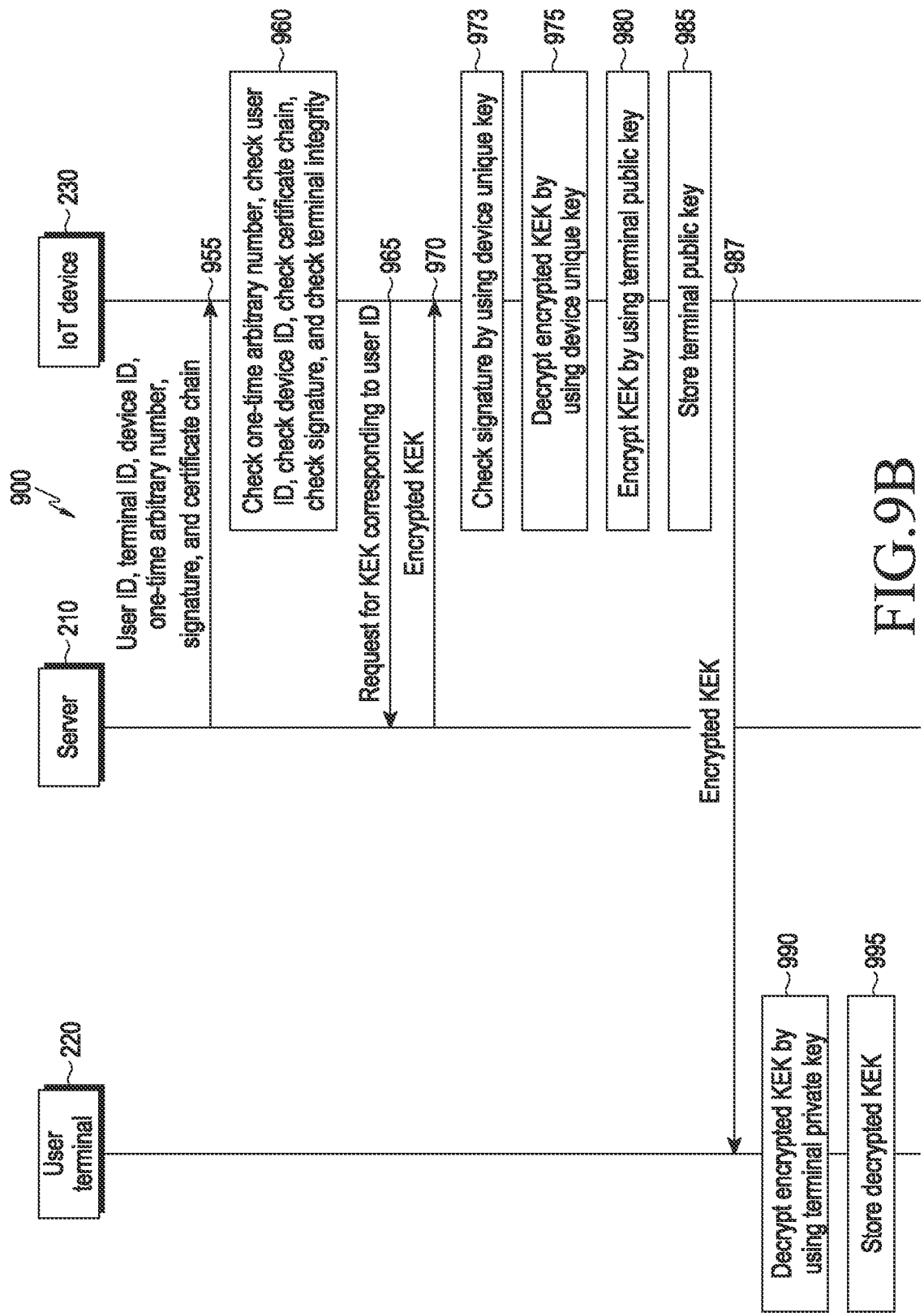

FIG. 9A and FIG. 9B are a signal flow diagrams 900 illustrating examples of KEK sharing in the content providing system 200 according to various embodiments.

In an embodiment, after the user terminal 220 is registered in the server 210, in operation 905, the at least one processor 222 of the user terminal 220 may transmit a one-time arbitrary number request to the server 210 (e.g., a key management server) through the communication circuit 221. In an embodiment, the one-time arbitrary number request may be triggered by a particular app of the user terminal 220.

In an embodiment, in response to the one-time arbitrary number request, in operation 910, the server 210 may transfer the one-time arbitrary number request to the IoT device 230. In an embodiment, in operation 915, the at least one processor 232 of the IoT device 230 having received the one-time arbitrary number request may generate a one-time arbitrary number. In an embodiment, the generated one-time arbitrary number may have a predetermined valid time (e.g., within 5 minutes). In an embodiment, in operation 920, the at least one processor 232 of the IoT device 230 may transmit the generated one-time arbitrary number to the server 210 through the communication circuit 231. In an embodiment, in operation 925, the server 210 may transfer the one-time arbitrary number to the user terminal 220.

In operation 910 to operation 925, the user terminal 220 is described to receive a one-time arbitrary number from the IoT device 230 through the server 210. In an embodiment, the user terminal 220 may directly request a one-time arbitrary number to the IoT device 230, and may directly receive the one-time arbitrary number generated by the IoT device 230 from the IoT device 230.

In an embodiment, in operation 930, the at least one processor 232 may perform integrity checking of the user terminal 220. In an embodiment, when the integrity checking is passed, the user terminal 220 may obtain a certificate chain. In an embodiment, even when the integrity checking is not passed, the user terminal 220 may obtain a certificate chain (a terminal certificate chain) of the user terminal 220, which includes a result of the integrity checking. In an embodiment, the certificate chain may include a public key and/or integrity information of the user terminal 220.

In an embodiment, in operation 935, the at least one processor 222 may write a signature on a user ID, a terminal ID, a device ID, the one-time arbitrary number, and/or a public key for encryption using a secret key of an app of the user terminal 220. In an embodiment, in a case where the public key for encryption is the same as the public key included in the certificate chain, the at least one processor 222 may not sign for the public key for encryption. In an embodiment, in a case where the one-time arbitrary number is already included in the certificate chain, the at least one processor 222 may not sign for the arbitrary number. In an embodiment, the signing may be performed using a key injected during a unique process of the user terminal instead of the secret key generated by the app of the user terminal 220. In an embodiment, in operation 940, the at least one processor 222 may transmit a KEK request to the server 210 (e.g., a device management server) through the communication circuit 221. In an embodiment, the transmission of the KEK request may include transmission of at least one of the user ID, the terminal ID, the device ID, the one-time arbitrary number, the public key for encryption, the signature, and the certificate chain.

In an embodiment, in operation 945, the server 210 (e.g., an authority management server) having received the KEK request may check an authority of the user terminal 220, which is a requester. In an embodiment, in operation 950, the server 210 (e.g., the key management server) having received the KEK request may check whether the user terminal 220 is registered. In an embodiment, for checking of operation 945 and/or operation 950, at least one of the user ID, the terminal ID, the device ID, the one-time arbitrary number, the public key for encryption, the signature, and the certificate chain may be used.

In an embodiment, when the checking of operation 945 and/or operation 950 is passed, in operation 955, the server 210 (e.g., the device management server) may transmit a KEK request to the IoT device 230. In an embodiment, the transmission of the KEK request may include transmission of at least one of the user ID, the terminal ID, the device ID, the one-time arbitrary number, the public key for encryption, the signature, and the certificate chain.

In an embodiment, the at least one processor 222 may directly transmit a KEK request to the IoT device 230 through the communication circuit 221. In this case, checking of operation 945 and/or operation 950, which is performed by the server 210, may not be performed. In an embodiment, the transmission of the KEK request may include transmission of at least one of the user ID, the terminal ID, the device ID, the one-time arbitrary number, the public key for encryption, the signature, and the certificate chain.

In an embodiment, in operation 960, the at least one processor 232 of the IoT device 230 may check each of at least one of the one-time arbitrary number, the user ID, the device ID, the certificate chain, the signature, and the terminal integrity, which are received from the server 210 or the user terminal 220. In an embodiment, the checking of the user ID may include checking whether the user ID matches a user ID received from the server 210 when the IoT device 230 is registered in the server 210 (e.g., the device management server) or a user ID of a member assigned through a clip sharing checking. In an embodiment, the checking of the device ID may include checking whether the device ID matches a device ID of the IoT device 230. In an embodiment, the checking of the certificate chain may be performed using a root certificate of an integrity verification module of the user terminal 220, which is already stored in the IoT device 230. In an embodiment, the checking of the signature may be performed using a public key of an app of the user terminal 220, which is included in the certificate chain.

In an embodiment, when checking of operation 960 is passed, in operation 965, the at least one processor 232 of the checking 965 may transmit a request for a KEK corresponding to the user ID to the server 210 through the communication circuit 231. In an embodiment, in operation 970, the server 210 having received the KEK request may transmit a KEK to the IoT device 230. In an embodiment, the KEK transmitted from the server 210 to the IoT device 230 may include all KEKs applied to devices of a user of the IoT device 230.

In an embodiment, in operation 973, the at least one processor 232 may check, using a device unique key, a signature of the KEK received from the server 210 through the communication circuit 231. In an embodiment, when checking of the signature of the KEK is passed, in operation 975, the at least one processor 232 may decrypt, using the device unique key, the KEK received from the server 210 through the communication circuit 231. In an embodiment, in operation 980, the at least one processor 232 may encrypt the decrypted KEK using a public key of an app of the user terminal 220. In an embodiment, the certificate chain received from the server 210 or the user terminal 220 may include the public key of the app of the user terminal 220. In an embodiment, instead of operation 965 to operation 980, the at least one processor 232 may encrypt a KEK stored in the memory 233. In an embodiment, in operation 985, the at least one processor 232 may store, in the memory 233, the public key of the app of the user terminal 220, which is included in the certificate chain. In an embodiment, the public key of the app of the user terminal 220, which is stored in the memory 233, may be used for a signature checking during an encryption configuration or a clip sharing configuration.

In an embodiment, in operation 987, the at least one processor 232 may transmit the encrypted KEK to the user terminal 220 through the communication circuit 231. In an embodiment, the encrypted KEK may be directly transferred to the user terminal 220, or may be transferred through the device management server 210. In an embodiment, in operation 990, the at least one processor 222 may decrypt the encrypted KEK using a secret key of the app of the user terminal 220. In an embodiment, in operation 995, the at least one processor 222 may store the decrypted KEK in the memory 223.

Figure 10:
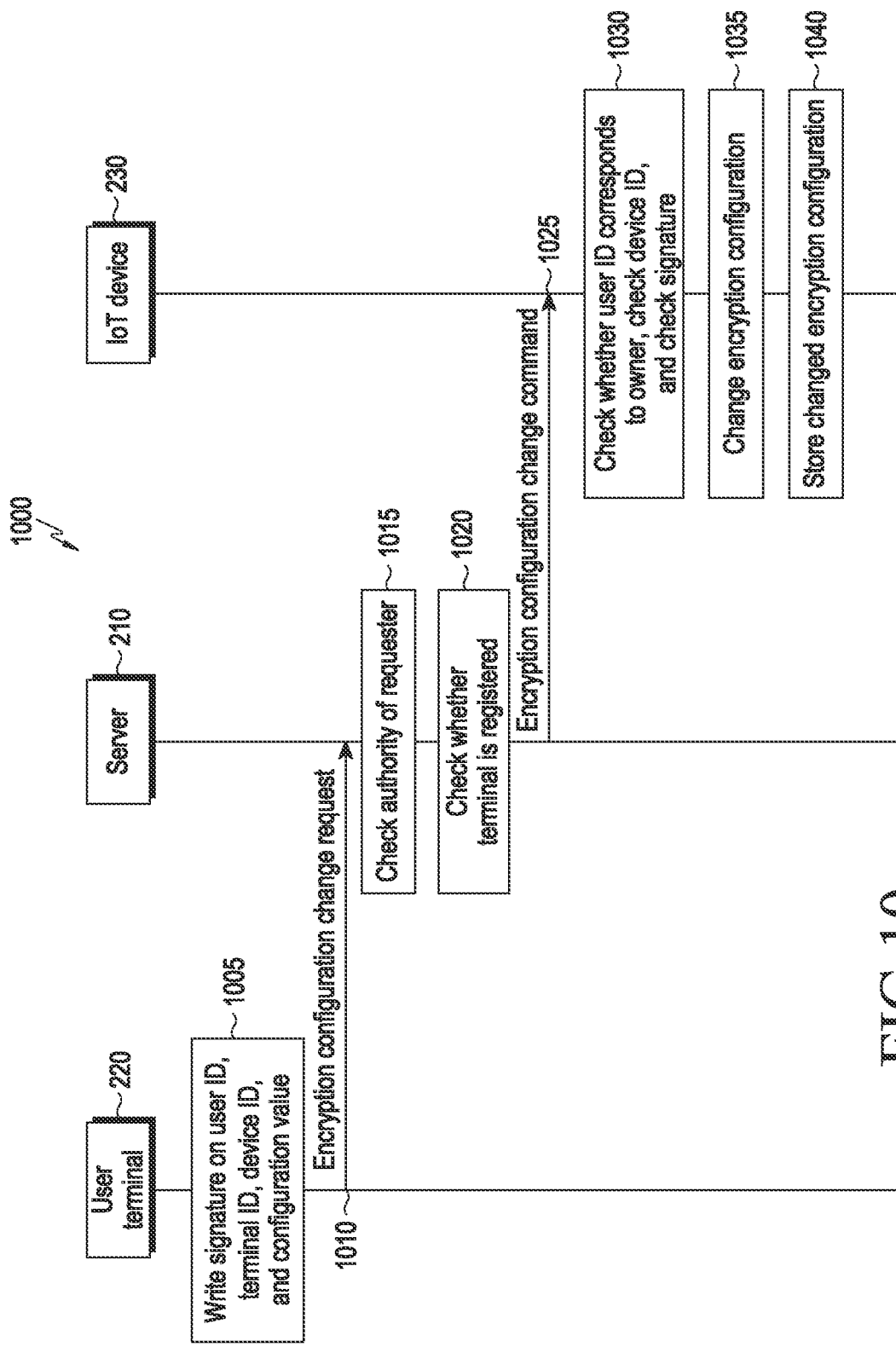
FIG. 10 is a signal flow diagram illustrating an example of encryption configuration change in a content providing system according to various embodiments.

FIG. 10 is a signal flow diagram 1000 illustrating an example of encryption configuration change in the content providing system 200 according to various embodiments.

In an embodiment, a user of the user terminal 220 may change an encryption configuration of the IoT device 230 according to a procedure illustrated in FIG. 10. In an embodiment, the at least one processor 222 of the user terminal 220 may sense the user's input relating to a change of the encryption configuration through the input unit 225. In an embodiment, in operation 1005, the at least one processor 222 may write a signature on a user ID, a terminal ID, a device ID, and/or a configuration value using a secret key of an app of the user terminal 220. In an embodiment, the configuration value may have an identifiable type such as a character string or a bit value indicating true/false.

In an embodiment, in operation 1010, the at least one processor 222 may transmit an encryption configuration change request to the server 210 through the communication circuit 221. In an embodiment, the transmission of the encryption configuration change request may include transmission of the signed user ID, terminal ID, device ID, and/or configuration value. In an embodiment, in operation 1015, the server 210 (e.g., an authority management server) having received the encryption configuration change request may check whether the user of the user terminal 220, which is a requester, is an owner of the IoT device. In an embodiment, in operation 1020, the server 210 (e.g., a key management server) may check whether the user terminal 220 is registered. In an embodiment, when the checking of operation 1015 and/or operation 1020 is passed, in operation 1025, the server 210 may transmit an encryption configuration change command (request) to the IoT device 230. In an embodiment, the transmission of the encryption configuration change command (request) may include transmission of the user ID, the terminal ID, the device ID, the configuration value, and/or the signature.

In an embodiment, in operation 1030, the at least one processor 232 may check each of the user ID, the device ID, and/or the signature. In an embodiment, the checking of the user ID may include checking whether the user ID transmitted from the server 210 to the IoT device 230 matches a user ID which has been transferred at the time of registration of the IoT device 230 in the server. In an embodiment, the checking of the device ID may include checking whether the device ID transmitted from the server 210 to the IoT device 230 matches a device ID which has been transferred at the time of registration of the IoT device 230 in the server. In an embodiment, the at least one processor 232 may check the signature using a public key of the app of the user terminal 220, which is stored in the memory 233. In an embodiment, in a case where the public key of the app of the user terminal 220, which is stored in the memory 233, has been removed by initialization of the IoT device 230, the at least one processor 232 may receive, through the communication circuit 231, terminal information stored in the server 210. In an embodiment, in a case where the public key of the app of the user terminal 220, which is stored in the memory 233, has been removed by initialization of the IoT device 230, the at least one processor 232 may check a certificate chain in the terminal information using a root certificate of the user terminal 220. In an embodiment, in a case where the public key of the app of the user terminal 220, which is stored in the memory 233, has been removed by initialization of the IoT device 230, the at least one processor 232 may check the signature using the public key of the app of the user terminal 200, which is included in the certificate chain.

In an embodiment, when checking of operation 1030 is passed, in operation 1035, the at least one processor 232 may change the encryption configuration according to the configuration value. In an embodiment, in operation 1040, the at least one processor 232 may store the changed encryption configuration in the memory 233.

Figure 11A:
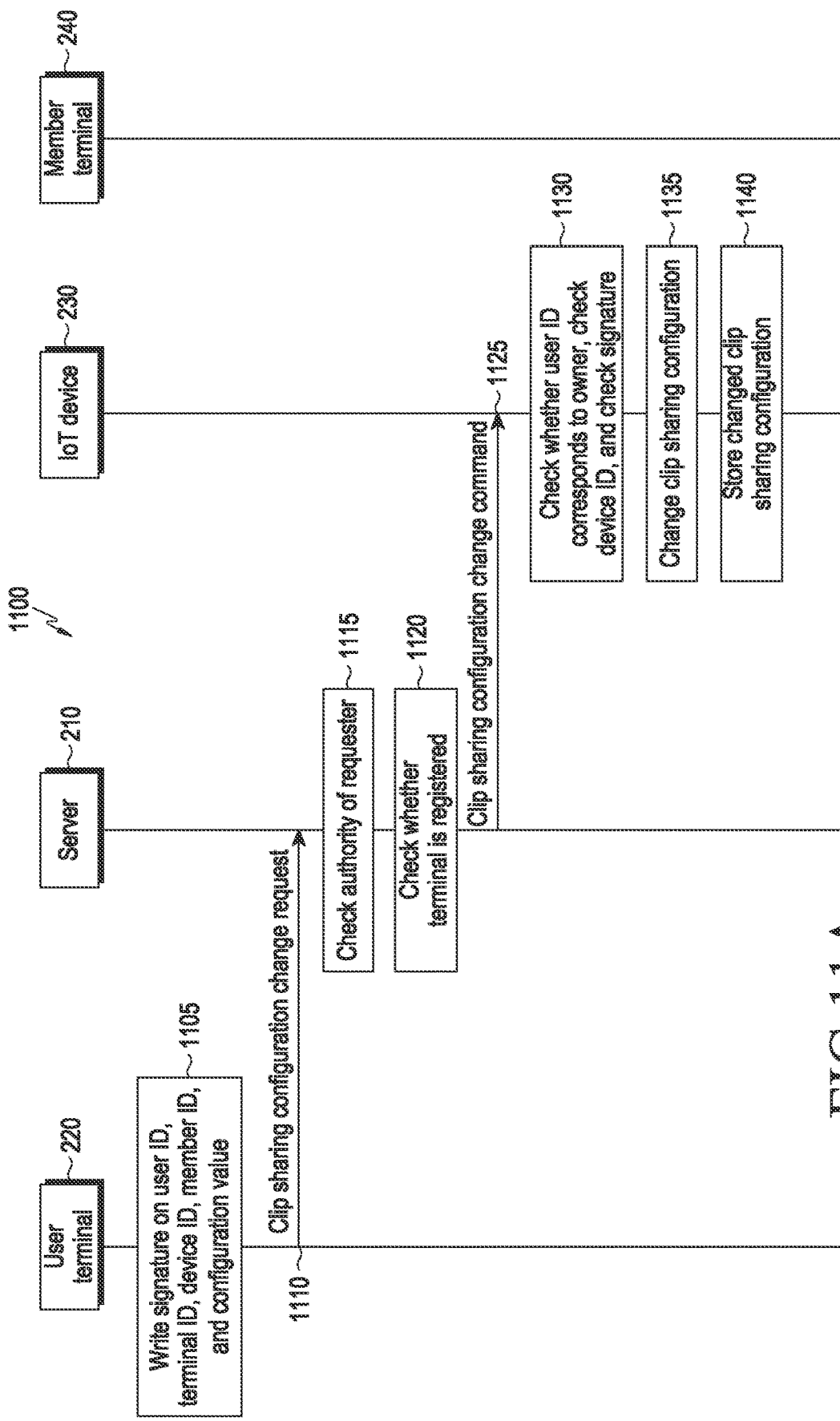
FIG. 11A and FIG. 11B are signal flow diagrams illustrating examples of clip sharing configuration change in a content providing system according to various embodiments.
Figure 11B:
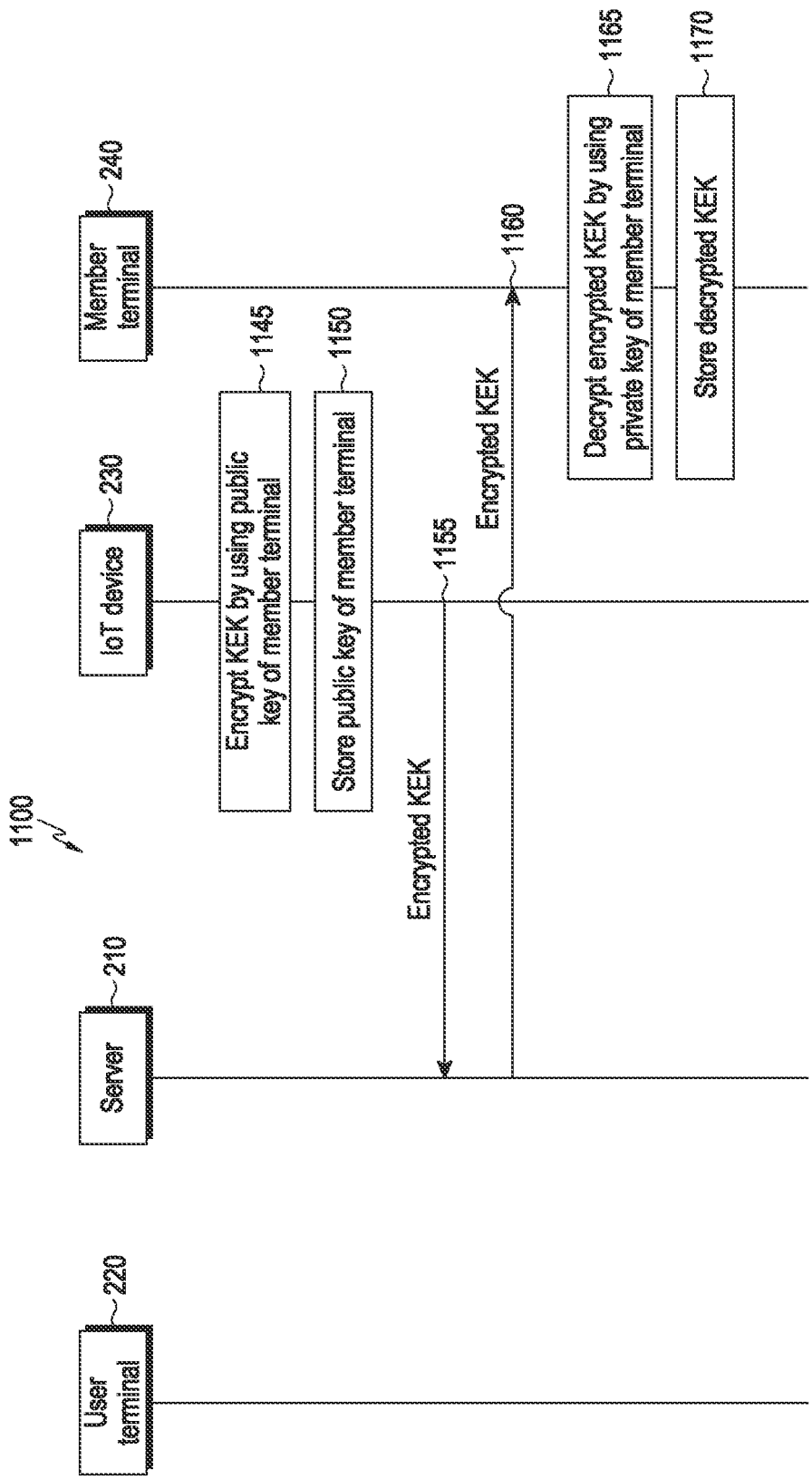

FIG. 11A and FIG. 11B are signal flow diagrams 1100 illustrating an example of clip sharing configuration change in the content providing system 200 according to various embodiments.

In an embodiment, a user of the user terminal 220 may change a clip sharing configuration of a particular member other than an owner (or a user) of the user terminal 220 according to a procedure illustrated in FIG. 11. In an embodiment, the at least one processor 222 of the user terminal 220 may sense (e.g., receive) the user's input relating to a change of the clip sharing configuration through the input unit 225. In an embodiment, in operation 1105, the at least one processor 222 may write a signature on a user ID, a terminal ID, a device ID, a member ID for which a clip sharing configuration is to be changed, and/or a configuration value using a secret key of an app of the user terminal 220. In an embodiment, the configuration value may have an identifiable type such as a character string or a bit value indicating true/false.

In an embodiment, in operation 1110, the at least one processor 222 may transmit a request relating to a clip sharing configuration change to the server 210 through the communication circuit 221. In an embodiment, the transmission of the request relating to the clip sharing configuration change may include transmission of the signed user ID, terminal ID, device ID, member ID, and/or configuration value. In an embodiment, in operation 1115, the server 210 (e.g., an authority management server) having received the request relating to the clip sharing configuration may checking whether the user of the user terminal 220, which is a requester, is an owner of the IoT device 230. In an embodiment, when a result of the checking indicates that the user is the owner of the IoT device 230, the authority management server may assign, to a member, an authority to share a clip generated in the IoT device 230. In an embodiment, the member may be specified by the member ID. In an embodiment, in operation 1120, the server 210 (e.g., a key management server) may check whether the user terminal 220 is registered.

In an embodiment, when it is identified that checking of operation 1115 and/or operation 1120 has been passed, the server 210 may transmit, in operation 1125, a clip sharing configuration change command (or request) for the member ID to the IoT device 230. In an embodiment, the clip sharing configuration change command (or request) may include transmission of the user ID, the terminal ID, the device ID, the member ID, the configuration value, and/or the signature.

In an embodiment, in operation 1130, the at least one processor 232 of the IoT device 230 may check each of the user ID, the device ID, and/or the signature, which are received from the server 210. In an embodiment, the check of the user ID may include checking whether the user ID transmitted in operation 1125 matches a user ID which has been transferred at the time of registration of the IoT device 230 in the server. In an embodiment, the checking of the device ID may include checking whether the device ID transmitted in operation 1125 matches a device ID which has been transferred at the time of registration of the IoT device 230 in the server. In an embodiment, the at least one processor 232 may check the signature using a public key of the app of the user terminal 220, which is stored in the memory 233. In an embodiment, in a case where the public key of the app of the user terminal 220, which is stored in the memory 233, has been removed by initialization of the IoT device 230, the at least one processor 232 may receive, through the communication circuit 231, terminal information stored in the server 210. In an embodiment, in a case where the public key of the app of the user terminal 220, which is stored in the memory 233, has been removed by initialization of the IoT device 230, the at least one processor 232 may check a certificate chain in the terminal information using a root certificate of the user terminal 220. In an embodiment, in a case where the public key of the app of the user terminal 220, which is stored in the memory 233, has been removed by initialization of the IoT device 230, the at least one processor 232 may check the signature using the public key of the app of the user terminal 200, which is included in the certificate chain. In an embodiment, when checking of operation 1130 is passed, in operation 1135, the at least one processor 232 may change the clip sharing configuration for the member ID according to the configuration value. In an embodiment, in operation 1140, the at least one processor 232 may store the changed clip sharing configuration in the memory 233.

In an embodiment, the member terminal 240 may receive and share a KEK from the server 210 or the IoT device 230 through the operations of the user terminal 220 performed in FIG. 9A and FIG. 9B.

In a case where a connection state between the IoT device 230 and the server 210 is not good, or the IoT device 230 is unavailable, the following operations may be performed instead of operation 1125. In an embodiment, an owner (user) of the IoT device 230 and the user terminal 220 may download, in an app of the member terminal 240 and through the user terminal 220, a one-time arbitrary number, a member ID, a terminal ID, a certificate chain, and/or a signature which are stored in the memory 213 of the server 210. In an embodiment, the at least one processor 222 of the user terminal 220 may request a one-time arbitrary number from the server 210 (e.g., a key server) through the communication circuit 221 so as to receive a one-time arbitrary number. In an embodiment, after the downloading is complete, the at least one processor 222 may check the member ID, the certificate chain, and/or the signature. In an embodiment, the checking of the certificate chain may be performed using a root certificate of an integrity verification module of the user terminal 220. In an embodiment, the at least one processor 222 may request a certificate from the integrity verification module of the user terminal 220 using the one-time arbitrary number, so as to check terminal integrity (e.g., checking of an origin of a terminal key, a security level of authentication of a terminal security module, and an integrity state of the terminal). In an embodiment, the user terminal 220 may obtain a terminal certificate chain as a result of integrity checking. In an embodiment, the at least one processor 222 may encrypt a KEK stored in the memory 223 (e.g., a key storage), using a public key of the member terminal 240, which is included in a certificate chain of the member terminal 240. In an embodiment, the at least one processor 222 may write a signature on the user ID, the member ID, a member terminal ID, the one-time arbitrary number, the device ID, and/or the encrypted KEK using the secret key of the app of the user terminal 220. In an embodiment, the at least one processor 222 may transmit, to the server 210, the user ID, the member ID, the member terminal ID, the one-time arbitrary number, the device ID, the encrypted KEK, the signature, and/or the certificate chain of the user terminal 220. In an embodiment, the server 210 may perform checking of the user ID, checking of the certificate chain, checking of the signature, and/or integrity checking of the user terminal 220. In an embodiment, when checking of the user ID, checking of the certificate chain, checking of the signature, and/or integrity checking of the user terminal 220 is passed, the server 210 may store, in the memory 213, the member ID, the terminal ID, the one-time arbitrary number, the device ID, the encrypted KEK, the signature, and/or the certificate chain.

In an embodiment, in operation 1145, the at least one processor 232 may encrypt a KEK using a public key of the member terminal 240. In an embodiment, in operation 1150, the at least one processor 232 may store the public key of the member terminal 240 in the memory 233. In an embodiment, in operation 1155, the at least one processor 232 may transfer the KEK encrypted using the public key of the member terminal 240 to the server 210 through the communication circuit 231.

In an embodiment, in operation 1160, the server 210 may transfer the KEK encrypted using the public key of the member terminal 240 to the member terminal 240. In an embodiment, the member terminal 240 may receive the member ID, the terminal ID, the one-time arbitrary number, the device ID, the encrypted KEK, the signature, and/or the certificate chain. In an embodiment, the member terminal 240 may perform checking of the certificate chain, checking of the signature, and/or checking of terminal integrity. In an embodiment, the checking of the certificate chain may be performed using a terminal root certificate. In an embodiment, when checking of the certificate chain, checking of the signature, and/or checking of terminal integrity is passed, in operation 1165, the at least one processor 242 of the member terminal 240 may decrypt the received encrypted KEK using a secret key of an app of the member terminal 240. In an embodiment, in operation 1170, the at least one processor 242 of the member terminal 240 may store the decrypted KEK in the memory 243.

Figure 12:
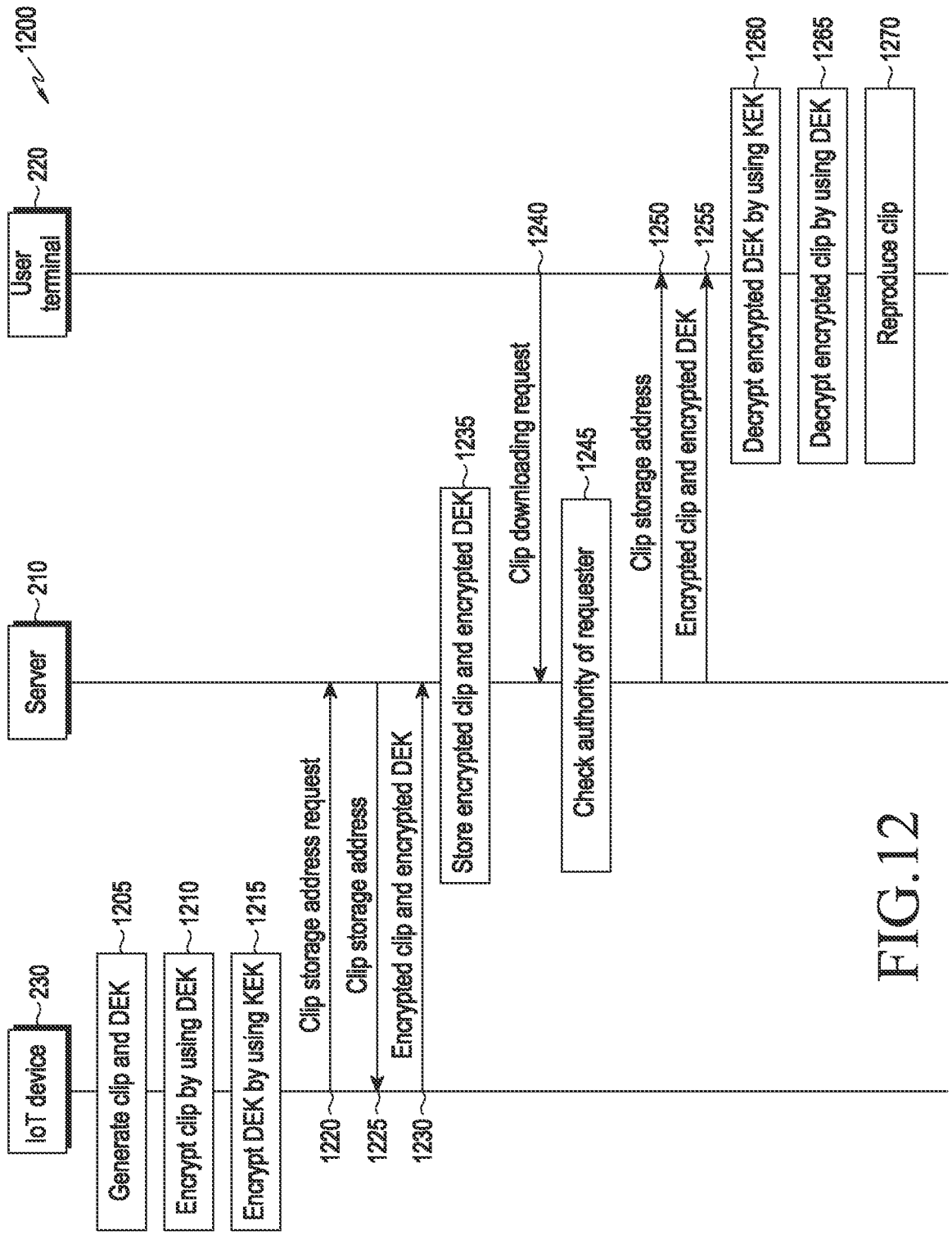
FIG. 12 is a signal flow diagram illustrating an example of clip generation and reproduction in a content providing system according to various embodiments.

FIG. 12 is a signal flow diagram 1200 illustrating an example of clip generation and reproduction in the content providing system 200 according to various embodiments.

In an embodiment, in operation 1205, the at least one processor 232 of the IoT device 230 may generate a clip and a DEK corresponding thereto. In an embodiment, the at least one processor 232 may generate a cryptographic random DEK every time a clip is generated. In an embodiment, in operation 1210, the at least one processor 232 may encrypt the generated clip using the DEK, which is a symmetric key. In an embodiment, in operation 1215, the at least one processor 232 may encrypt the DEK using a KEK.

In an embodiment, in operation 1220, the at least one processor 232 may request an address, in which the clip is to be stored (uploaded), from the server 210 (e.g., a media server) through the communication circuit 231. In an embodiment, in operation 1225, the at least one processor 232 may receive a clip storage address in the memory 213 from the server 210 through the communication circuit 231. In an embodiment, in operation 1230, the at least one processor 232 may transmit the encrypted clip and the encrypted DEK to the clip storage address through the communication circuit 231. In an embodiment, one encrypted clip and an encrypted DEK corresponding thereof may be transferred as a pair. In an embodiment, in a case where the clip storage address is already stored in the memory 233 of the IoT device 230, the at least one processor 232 may transmit the encrypted clip and the encrypted DEK in the clip storage address through the communication circuit 231 without a request of operation 1220. In an embodiment, in operation 1235, the server 210 may store the encrypted clip and the encrypted DEK in the clip storage address of the memory 213.

In an embodiment, in operation 1240, the at least one processor 222 of the user terminal 220 may send a request to download a clip to the server 210 (e.g., the media server) through the communication circuit 221. In an embodiment, in operation 1245, the server 210 (e.g., an authority management server) may check, based on a user ID, whether a user of the user terminal 220, which is a requester, has an authority to use a clip. In an embodiment, when checking of operation 1245 is passed, in operation 1250, the server 210 may transmit information relating to the clip storage address of the memory 213 to the user terminal 220. In an embodiment, in a case where the information relating to the clip storage address is stored in the memory 223 of the user terminal 220, the server 210 may not transmit the information relating to the clip storage address to the user terminal 220. In an embodiment, in operation 1255, the user terminal 220 may download the encrypted clip and the DEK corresponding thereto from the clip storage address. In an embodiment, one encrypted clip and an encrypted DEK corresponding thereof may be downloaded as a pair.

In an embodiment, in operation 1260, the at least one processor 222 of the user terminal 220 may decrypt the encrypted DEK using a KEK stored in the memory 223. In an embodiment, in operation 1265, if the input unit 225 of the user terminal 220 senses a particular input, the at least one processor 222 may decrypt each encrypted clip through a corresponding DEK using the decrypted DEK. In an embodiment, in operation 1270, if the input unit 225 of the user terminal 220 senses (e.g., receives) an input, the at least one processor 222 may reproduce the decrypted clip through the display 224. In an embodiment, clip decryption of operation 1265 and/or decrypted clip reproduction of operation 1270 may be performed without a user's input.

Figure 13:
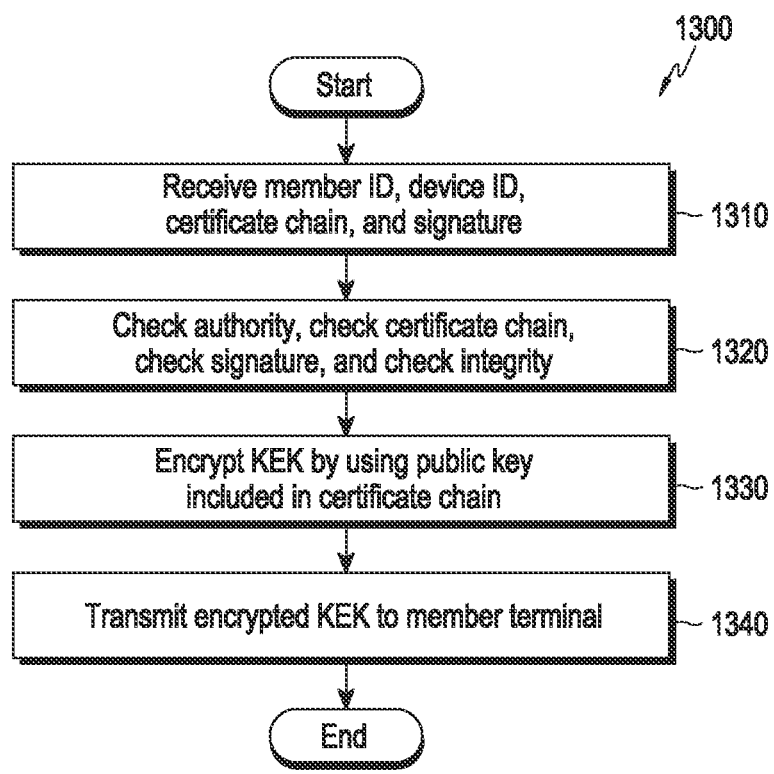
FIG. 13 is a flowchart illustrating an example procedure of KEK sharing between terminals close to each other according to various embodiments.

FIG. 13 is a flowchart 1300 illustrating an example procedure of KEK sharing between terminals close to each other according to various embodiments.

The following operations may be performed in order for the user terminal 220 to share a KEK with the member terminal 240 which is close to the user terminal. In an embodiment, the at least one processor 242 of the member terminal 240 may perform integrity checking, and obtain a certificate chain as a result of the integrity checking. In an embodiment, the at least one processor 242 may write a signature on a member ID and a device ID using a secret key generated by an app of the member terminal 240.

In an embodiment, in operation 1310, the at least one processor 222 of the user terminal 220 may receive the member ID, the device ID, the certificate chain, and/or the signature, which are received from the member terminal 240. In an embodiment, the reception of the member ID, the device ID, the certificate chain, and/or the signature may include capturing an image of a QR code displayed on the member terminal 240, or using a ultra-wide band (UWB). In an embodiment, the at least one processor 222 may receive, through the communication circuit 221, a request to share a KEK with the member terminal 240, at least one identifier corresponding to the sharing request, a third certificate including a third public key, and a signature through the server 210. In an embodiment, the at least one identifier may include the member ID and/or the device ID.

In an embodiment, in operation 1320, the at least one processor 222 may perform checking of an authority of the member ID to use a device, checking of the certificate chain, checking of the signature, and/or integrity checking of the member terminal 240. In an embodiment, the at least one processor 222 may request, through the communication circuit 221, the server (e.g., the authority management server) to check whether the member ID has an authority to use a device. In an embodiment, the user terminal 220 may request the server (e.g., a key management server) to check whether the terminal is registered. In an embodiment, the user terminal 220 may check a certificate chain by the user terminal itself. In an embodiment, the user terminal 220 may check a KEK use authority of the user terminal through the checking of the certificate chain. In an embodiment, the at least one processor 222 may check the certificate chain. In an embodiment, the at least one processor 222 may check the signature using a public key of the app of the member terminal 240, which is included in the certificate chain.

In an embodiment, when all or a part of the checking of operation 1320 is successfully passed, in operation 1330, the at least one processor 222 may encrypt a KEK stored in the memory 223, using the public key of the app of the member terminal 240, which is included in the certificate chain. In an embodiment, the at least one processor 222 may perform integrity checking, and obtain a certificate chain as a result of the integrity checking. In an embodiment, the at least one processor 222 may write a signature on the member ID, the device ID, and/or the encrypted KEK. In an embodiment, in operation 1340, the at least one processor 222 may transmit the member ID, the device ID, the encrypted KEK, the signature, and/or the certificate chain to the member terminal 240. In an embodiment, the encrypted KEK may be transferred to the member terminal 240 using a UWB or a QR code. In an embodiment, the member terminal 240 may receive the encrypted KEK by capturing an image of a QR code displayed on the display 224 of the user terminal 220, or receiving a UWB. In an embodiment, the at least one processor 242 may perform checking of the member ID, checking of the certificate chain, and/or checking of the signature. In an embodiment, when checking of the member ID, checking of the certificate chain, and/or checking of the signature is passed, the at least one processor 242 may decrypt the encrypted KEK using a secret key of the app of the member terminal 240. In an embodiment, the at least one processor 242 may store the decrypted KEK in the memory 243.

In FIG. 13, a case of sharing a KEK with the member terminal 240, which is closely positioned, is illustrated by way of non-limiting example. However, according to various embodiments of the disclosure, the user terminal 220 can share a KEK even with another terminal used by a user of the user terminal 220. In an embodiment, in a case where the user terminal 220 shares a KEK with another terminal used by the user, in operation 1310, a user ID may be received instead of the member ID.

Figure 14:
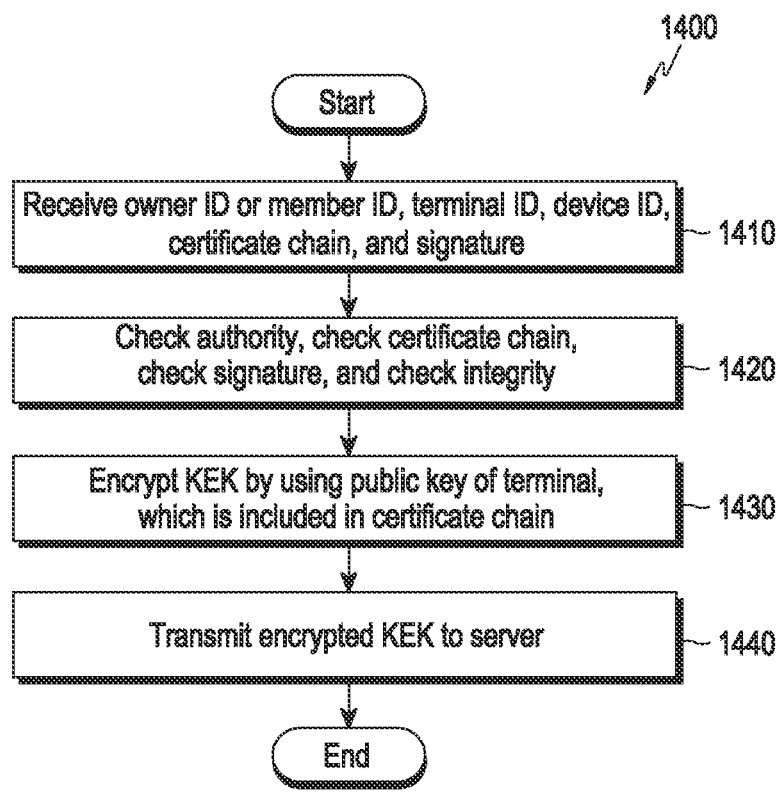
FIG. 14 is a flowchart illustrating an example procedure of sharing a KEK with a terminal close to an IoT device by the IoT device according to various embodiments.

FIG. 14 is a flowchart 1400 illustrating an example procedure of sharing a KEK with a terminal close to the IoT device 230 by the IoT device according to various embodiments.

The user terminal 220 or the member terminal 240 may perform the following operations in order to share a KEK with the IoT device 230 (e.g., a camera) positioned close to the user terminal or the member terminal. In an embodiment, the at least one processor 222 of the user terminal 220 or the at least one processor 242 of the member terminal 240 may perform integrity checking, and obtain a certificate chain as a result of the integrity checking. In an embodiment, the at least one processor 222 or the at least one processor 242 may write a signature on a user ID (in a case of the user terminal 220) or a member ID (in a case of the member terminal 240), a terminal ID, and/or a device ID using a secret key generated in an app of the user terminal 220 or the member terminal 240. In an embodiment, the at least one processor 222 or the at least one processor 242 may display the user ID (in a case of the user terminal 220) or the member ID (in a case of the member terminal 240), the terminal ID, the device ID, the certificate chain, and/or the signature on the display 224 or the display 244. In an embodiment, the at least one processor 232 of the IoT device 230 may receive, through the communication circuit 231, a request to share a KEK with the user terminal 220 or the member terminal 240, at least one identifier corresponding to the sharing request, a second certificate including a public key, and a signature. In an embodiment, in operation 1410, the IoT device 230 may receive a user ID (in a case of the user terminal 220) or a member ID (in a case of the member terminal 240), a terminal ID, a device ID, a certificate chain, and/or a signature through a QR code displayed on the display 224 of the user terminal 220 or the display 244 of the member terminal 240.

In an embodiment, in operation 1420, the at least one processor 232 of the IoT device 230 may perform checking of an authority of an owner ID or the member ID to use a device, checking of the certificate chain, checking of the signature, and/or integrity checking of the user terminal 220 or the member terminal 240. In an embodiment, the at least one processor 232 of the IoT device 230 may check whether the owner ID or the member ID has an authority, by the processor itself without requesting the server 210. In an embodiment, the IoT device 230 may request the server 210 (e.g., an authority management server) to check whether the owner ID or the member ID has an authority to use the IoT device 230. In an embodiment, the IoT device 230 may request the server (e.g., a key management server) to check whether the terminal is registered. In an embodiment, the IoT device 230 may check a certificate chain by the IoT device itself. In an embodiment, the IoT device 230 may check a KEK use authority of the owner ID or the member ID through the checking of the certificate chain. In an embodiment, the at least one processor 232 may check the certificate chain. In an embodiment, the at least one processor 232 may check the signature using a public key of the app, which is included in the certificate chain. In an embodiment, the at least one processor 232 may request a certificate from an integrity verification module of the IoT device 230 using a one-time arbitrary number, so as to check integrity of the IoT device 230.

In an embodiment, when all or a part of the checking of operation 1420 is successfully passed, in operation 1430, the at least one processor 232 may encrypt a KEK using the public key of the app of the user terminal 220 or the member terminal 240, which is included in the certificate chain. In an embodiment, the at least one processor 232 may write a signature on the owner ID or the member ID, the terminal ID, the device ID, and/or the encrypted KEK using a unique secret key of the IoT device 230. In an embodiment, in operation 1440, the at least one processor 232 may transmit the KEK encrypted using the unique secret key of the IoT device 230 to the server 210 through the communication circuit 231. In an embodiment, the encrypted KEK may be transmitted together with the owner ID or the member ID, the terminal ID, the device ID, the signature, and/or a certificate chain of the device. In an embodiment, the server 210 may store, in the memory 213, the received owner ID or member ID, terminal ID, device ID, encrypted KEK, signature, and/or device certificate chain. In an embodiment, the at least one processor 222 or the at least one processor 242 may receive the encrypted KEK, the signature, and the certificate chain from the server 210 through the communication circuit 221 or the communication circuit 241. In an embodiment, the encrypted KEK may correspond to the owner ID or the member ID, the terminal ID, and the device ID. In an embodiment, the at least one processor 222 or the at least one processor 242 may check the received certificate chain using a root certificate of the IoT device 230. In an embodiment, the at least one processor 222 or the at least one processor 242 may check a signature for a user ID or a member ID, a terminal ID, and/or a device ID, which are stored in a memory, using a unique public key of the IoT device 230. In an embodiment, the at least one processor 222 or the at least one processor 242 may decrypt the KEK using a secret key of the app of the user terminal 220 or the member terminal 240, so as to obtain the KEK.

Figure 15:
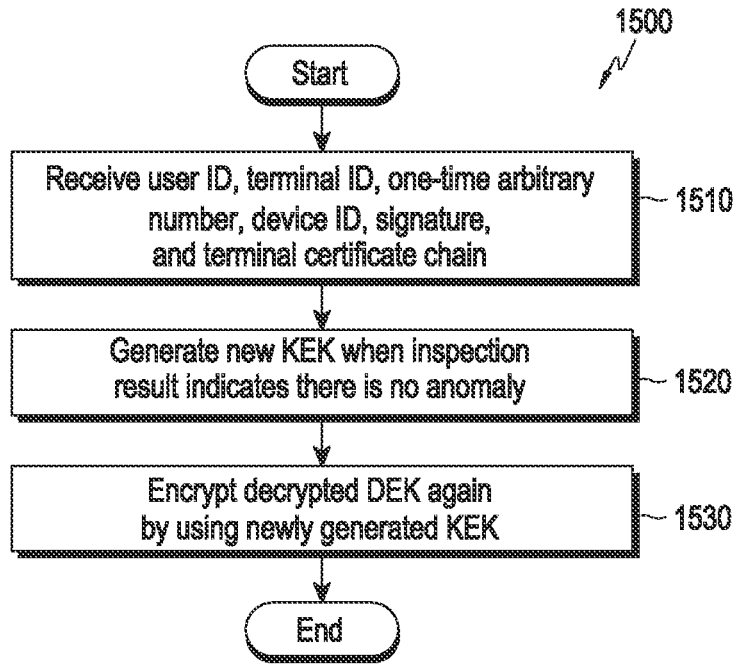
FIG. 15 is a flowchart illustrating an example procedure of KEK replacement caused by a user request according to various embodiments.

FIG. 15 is a flowchart 1500 illustrating an example procedure of KEK replacement caused by a user request according to various embodiments.

A KEK generated by the IoT device 230 may be replaced by a user's request. In an embodiment, when a user requests KEK replacement through the input unit 225 of the user terminal 220, the at least one processor 222 of the user terminal 220 may request a one-time arbitrary number from the IoT device 230 through the communication circuit 221. In an embodiment, the request for the one-time arbitrary number may be transferred to the IoT device 230 through the server 210. In an embodiment, in response to the request for the one-time arbitrary number, the at least one processor 232 of the IoT device 230 may generate a one-time arbitrary number. In an embodiment, the at least one processor 232 may transmit the generated one-time arbitrary number to the user terminal 220 through the communication circuit 231. In an embodiment, the one-time arbitrary number may be transmitted to the user terminal 220 through the server 210. In an embodiment, the at least one processor 222 may request a certificate from an integrity verification module of the user terminal 220 using the one-time arbitrary number, so as to check terminal integrity (e.g., checking of an origin of a terminal key, a security level of authentication of a terminal security module, and an integrity state of the terminal). In an embodiment, the user terminal 220 may obtain a terminal certificate chain as a result of integrity checking. In an embodiment, the at least one processor 222 may write a signature on a user ID, a terminal ID, a one-time arbitrary number, and/or a device ID using a secret key of an app of the user terminal 220.

In an embodiment, the at least one processor 222 of the user terminal 220 may transmit a key (e.g., a KEK) replacement request to the IoT device 230 through the communication circuit 221. In an embodiment, the key replacement request may be transmitted to the IoT device 230 through the server 210. In an embodiment, the transmission of the key replacement request may include transmission of the user ID, the terminal ID, the one-time arbitrary number, the device ID, the signature, and/or the terminal certificate chain. In an embodiment, the signature may include a signature on the user ID, the terminal ID, the one-time arbitrary number, and/or the device ID. In an embodiment, the at least one processor 232 of the IoT device 230 may receive, through the communication circuit 231, a KEK replacement request, at least one identifier corresponding to the replacement request, a second certificate including a second public key, and a signature. In an embodiment, in operation 1510, the at least one processor 232 may receive, through the communication circuit 231, a signed user ID, a signed terminal ID, a signed one-time arbitrary number, a signed device ID, a signature, and/or a terminal certificate chain.

In an embodiment, the at least one processor 232 may check each of the signed user ID, the signed terminal ID, the signed one-time arbitrary number, the signed device ID, and/or the terminal certificate chain. In an embodiment, in operation 1520, when the checking is passed, the at least one processor 232 may generate a new KEK. In an embodiment, the at least one processor 232 may request, through the communication circuit 231, a DEK(s) matching the device ID and the user ID from the server 210 (e.g., a clip server).

In an embodiment, the server 210 may transfer the DEK(s) encrypted using a KEK to the IoT device 230. In an embodiment, the server 210 may transfer a clip encrypted using the DEK, and a pair(s) of the DEK(s) encrypted using the KEK to the IoT device 230. In an embodiment, the at least one processor 232 of the IoT device 230 may decrypt the DEK using a KEK stored in the memory 233. In an embodiment, the at least one processor 232 may encrypt the decrypted DEK again using the newly generated KEK in operation 1530. In an embodiment, the at least one processor 232 may request, through the communication circuit 231, the server 210 to store, in the memory 213, the DEK encrypted again using the newly generated KEK.

In an embodiment, the at least one processor 232 may encrypt the newly generated KEK using a public key of an app of the user terminal 220, which is included in the terminal certificate chain, and then may transfer the encrypted KEK to the user terminal 220 through the communication circuit 231. In an embodiment, the at least one processor 222 of the user terminal 220 may decrypt the newly generated encrypted KEK transferred from the IoT device 230, using a secret key of the app of the user terminal 220. In an embodiment, the at least one processor 222 may update the memory 223 with the decrypted new KEK.

Figure 16:
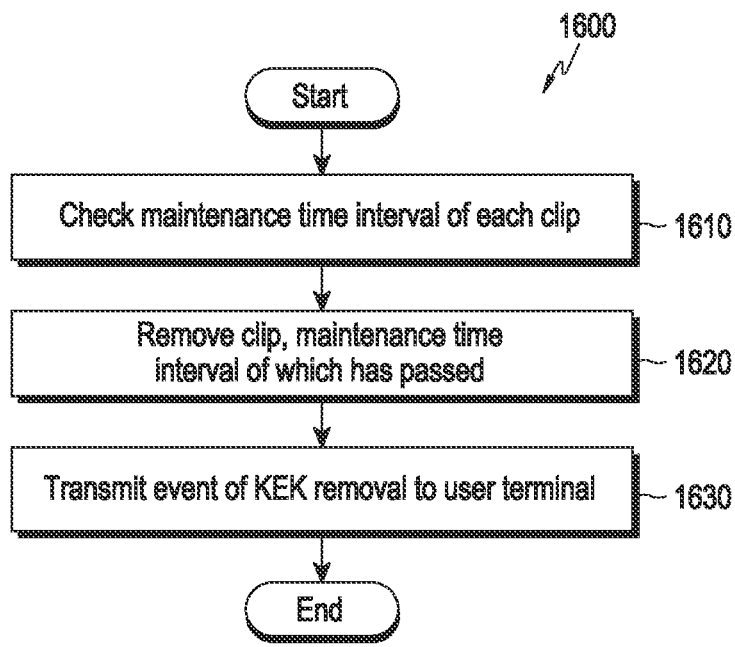
FIG. 16 is a flowchart illustrating an example KEK replacement procedure using a platform according to various embodiments.

FIG. 16 is a flowchart 1600 illustrating an example KEK replacement procedure using a platform according to various embodiments.

In an embodiment, the server 210 may remove a clip or a KEK which is not used among clips or KEKs stored in the memory 213, and replace same with a new KEK. In an embodiment, in operation 1610, the server 210 may check a maintenance time interval of each clip according to a predetermined period (e.g., one month) with respect to the clips stored in the memory 213 (e.g., a clip storage).

In an embodiment, in operation 1620, the server 210 may remove a clip, the maintenance time interval of which has passed. In an embodiment, each clip may be encrypted by a DEK.

In an embodiment, in operation 1630, the server 210 may transmit an event of KEK removal to the user terminal 220, the IoT device 230, and/or the member terminal 240. In an embodiment, in a case where any clips for a particular device ID are not stored in the memory 213, and records of server access via the corresponding device ID do not occur for a predetermined deactivation determination time interval (e.g., one week), the server 210 may remove all the KEK of the corresponding device ID, which are stored in the memory 213, and transmit an event of KEK removal to the user terminal 220, the IoT device 230, and/or the member terminal 240. In an embodiment, the user terminal 220 having received an event of KEK removal may request the IoT device 230 to perform KEK replacement. In an embodiment, the member terminal 240 having received an event of KEK removal may remove a KEK stored in the memory 243.

In an embodiment, the user terminal 220 may receive a one-time arbitrary number from the IoT device 230, and then write a signature on a user ID, a terminal ID, the one-time arbitrary number, and/or a device ID using a secret key of an app of the user terminal 220. In an embodiment, the user terminal 220 may perform integrity checking, and obtain a certificate chain as a result of the integrity checking. In an embodiment, the user terminal 220 may transmit a KEK replacement request to the IoT device 230. In an embodiment, the KEK replacement request may include transmission of the signed user ID, the signed terminal ID, the signed one-time arbitrary number, the signed device ID, and/or the certificate chain. In an embodiment, the KEK replacement request may be transferred to the IoT device 230 through the server 210 (e.g., a device configuration server).

In an embodiment, the IoT device 230 may check each of the signed user ID, the signed terminal ID, the signed one-time arbitrary number, the signed device ID, and/or the certificate chain. In an embodiment, if a result of the checking indicates that there is no anomaly, the IoT device 230 may request a one-time arbitrary number from the server 210 (e.g., a key server) so as to receive a one-time arbitrary number. In an embodiment, the IoT device 230 may sign for the one-time arbitrary number received from the server 210. In an embodiment, the IoT device 230 may newly generate a KEK, and encrypt same using a device unique key. In an embodiment, the IoT device 230 may write a signature on the user ID, the device ID, the one-time arbitrary number, and/or the encrypted KEK. In an embodiment, the IoT device 230 may transmit, to the server 210, the user ID, the device ID, the one-time arbitrary number, the encrypted KEK, the signature, a device certificate chain, and/or a KEK storage (backup) request. In an embodiment, when a key removal event is directly received from the server 210, the IoT device 230 may back up the newly generated KEK in the server. In an embodiment, the IoT device 230 may update a KEK stored in the memory 233. In an embodiment, at least one processor 232 of the IoT device 230 may encrypt the newly generated KEK using a public key of the app of the user terminal 220, which is included in the terminal certificate chain. The at least one processor 232 may transfer the encrypted KEK to the user terminal 220 through the communication circuit 231. In an embodiment, the at least one processor 222 of the user terminal 220 may decrypt the newly generated encrypted KEK transferred from the IoT device 230, using the secret key of the app of the user terminal 220. In an embodiment, the at least one processor 222 may update the memory 223 with the decrypted new KEK.

Figure 17:
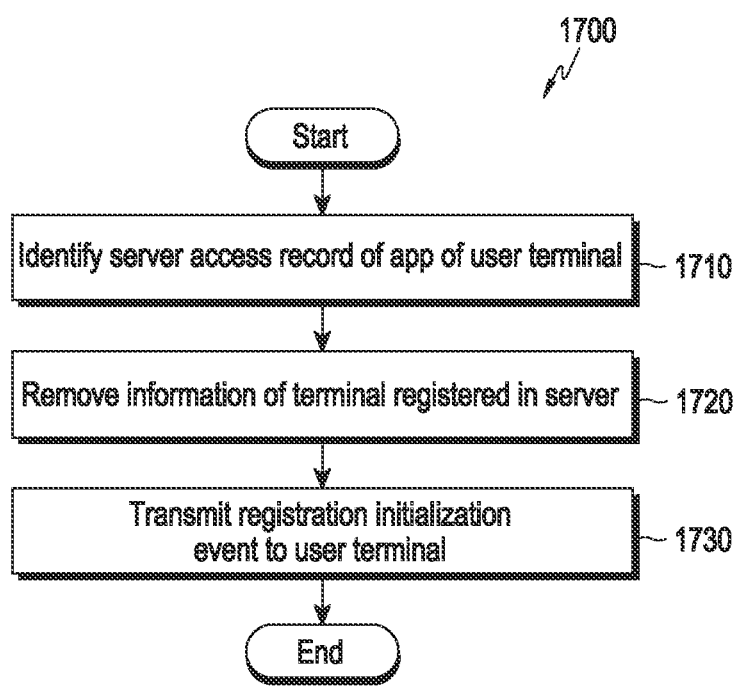
FIG. 17 is a flowchart illustrating an example procedure of removing a terminal registration by a server according to various embodiments.

FIG. 17 is a flowchart 1700 illustrating an example procedure of removing a terminal registration by the server 210 according to various embodiments.

The server 210 (e.g., a key server) may remove registration of a non-used terminal. In an embodiment, in operation 1710, the server 210 may identify a server access record of an app of the user terminal 220 according to a predetermined period (e.g., one month). In an embodiment, in operation 1720, the server 210 may remove terminal information of the user terminal 220, which is stored in the memory 213. In an embodiment, in a case where there are no records of access to the server 210 by an app of the user terminal 220 for a deactivation determination time interval (e.g., three months), the server 210 may remove terminal information of the user terminal 220, which is stored in the memory 213. In an embodiment, in operation 1730, the server 210 may transmit a registration initialization event to the user terminal 220. In an embodiment, in a case where the terminal having received the registration initialization event is being used, a terminal registration flag may be initialized. In an embodiment, the user terminal 220 having received the registration initialization event may perform a terminal registration procedure again with respect to the server 210 in order to use the IoT device 230 or access a clip. In an embodiment, when the user terminal 220, which has not been received the registration initialization event transmitted by the server 210, uses the IoT device 230 or accesses a clip, the use of the IoT device 230 or the access to a clip may be rejected for a server non-registration error. In an embodiment, the user terminal 220, which has been rejected from the use of the IoT device 230 or the access to a clip, may perform a terminal registration procedure again.

A method for providing an encrypted object by a first electronic device according to various example embodiments of the disclosure may include: receiving a first public key and a first request for a first symmetric key from a second electronic device; encrypting the first symmetric key using the first public key; transmitting the encrypted first symmetric key to the second electronic device, generating at least one object and at least one second symmetric key corresponding to the at least one object; encrypting the at least one object using the generated at least one second symmetric key, respectively; encrypting each of the at least one second symmetric key using the first symmetric key; and transmitting the encrypted at least one object and the encrypted at least one second symmetric key to the second electronic device.

The method for providing an encrypted object by the first electronic device according to various example embodiments of the disclosure may further include: receiving a first certificate and a signature; checking the first certificate; checking the signature using the first public key; and based on the checking of the first certificate and the checking of the signature being successfully passed, encrypting the first symmetric key using the first public key.

The method for providing an encrypted object by the first electronic device according to various example embodiments of the disclosure may further include: randomly generating the first symmetric key, encrypting the first symmetric key using a third symmetric key or a device unique secret key; and transmitting, to the second electronic device, a request to store the first symmetric key, at least one identifier corresponding to the request to store, and the first symmetric key encrypted using the third symmetric key or the device unique secret key.

The method for providing an encrypted object by the first electronic device according to various example embodiments of the disclosure may further include: transmitting, through the communication circuit, a second request for the first symmetric key and at least one identifier corresponding to the second request to the second electronic device; receive the encrypted first symmetric key from the second electronic device; and decrypting the encrypted first symmetric key using a first secret key.

The method for providing an encrypted object by the first electronic device according to various example embodiments of the disclosure may further include: receiving, through the communication circuit, a request to change an encryption configuration, at least one identifier corresponding to the request to change, a configuration value, and a signature from the second electronic device; and based on checking of the signature being successfully passed using a second public key of the second electronic device, changing the encryption configuration according to the configuration value.

The method for providing an encrypted object by the first electronic device according to various example embodiments of the disclosure may further include: receiving, through the communication circuit, a request to change a clip sharing configuration for a third electronic device, at least one identifier corresponding to the request to change, a configuration value, and a signature from the second electronic device; and based on checking of the signature being successfully passed using a second public key of the second electronic device, changing the clip sharing configuration for the third electronic device according to the configuration value.

The method for providing an encrypted object by the first electronic device according to various example embodiments of the disclosure may further include: receiving, through the communication circuit, a request to share the first symmetric key with the second electronic device, at least one identifier corresponding to the request to share, a second certificate including a second public key, and a signature from the second electronic device; based on checking of the signature being successfully passed using a public key of the second electronic device, encrypting the first symmetric key using the second public key; and transmitting the first symmetric key encrypted using the second public key to the second electronic device.

In various example embodiments of the disclosure, the first symmetric key encrypted using the second public key may be transmitted by the third electronic device capturing an image of a QR code displayed on the first electronic device, or the third electronic device using a UWB.

The method for providing an encrypted object by the first electronic device according to various example embodiments of the disclosure may further include: receiving, through the communication circuit, a request to replace the first symmetric key, at least one identifier corresponding to the request to replace, a second certificate including a second public key, and a signature from the second electronic device; when checking of the signature is successfully passed using the second public key, generating the first symmetric key; and encrypting each of the at least one second symmetric key using the new first symmetric key.

A method for receiving an encrypted object by a second electronic device according to various example embodiments of the disclosure may include: transmitting a first public key and a first request for a first symmetric key to a first electronic device; receiving the first symmetric key encrypted using the first public key from the first electronic device; decrypting the encrypted first symmetric key using a first secret key; transmitting a request for at least one object to the first electronic device; receiving, from the first electronic device, the at least one object encrypted using at least one second symmetric key, and the at least one second symmetric key encrypted using the first symmetric key; decrypting the encrypted at least one second symmetric key using the first symmetric key; and decrypting the encrypted at least one object using the at least one second symmetric key.

The method for receiving an encrypted object by the second electronic device according to various example embodiments of the disclosure may further include: obtaining a second certificate through integrity checking of the second electronic device; and transmitting a request to register the second electronic device, the second certificate, and an identifier of the second electronic device to the first electronic device.

The method for receiving an encrypted object by the second electronic device according to various example embodiments of the disclosure may further include: receiving a request to share the first symmetric key with a third electronic device, at least one identifier corresponding to the request to share, a third certificate including a third public key, and a signature from the first electronic device; based on checking of the signature being successfully passed using a second public key of the second electronic device, encrypting the first symmetric key using the third public key; and transmitting the first symmetric key encrypted using the third public key to the third electronic device.

In various example embodiments of the disclosure, the first symmetric key encrypted using the third public key may be transmitted by the third electronic device capturing an image of a QR code displayed on the second electronic device, or the third electronic device using a UWB.

Figure 18:
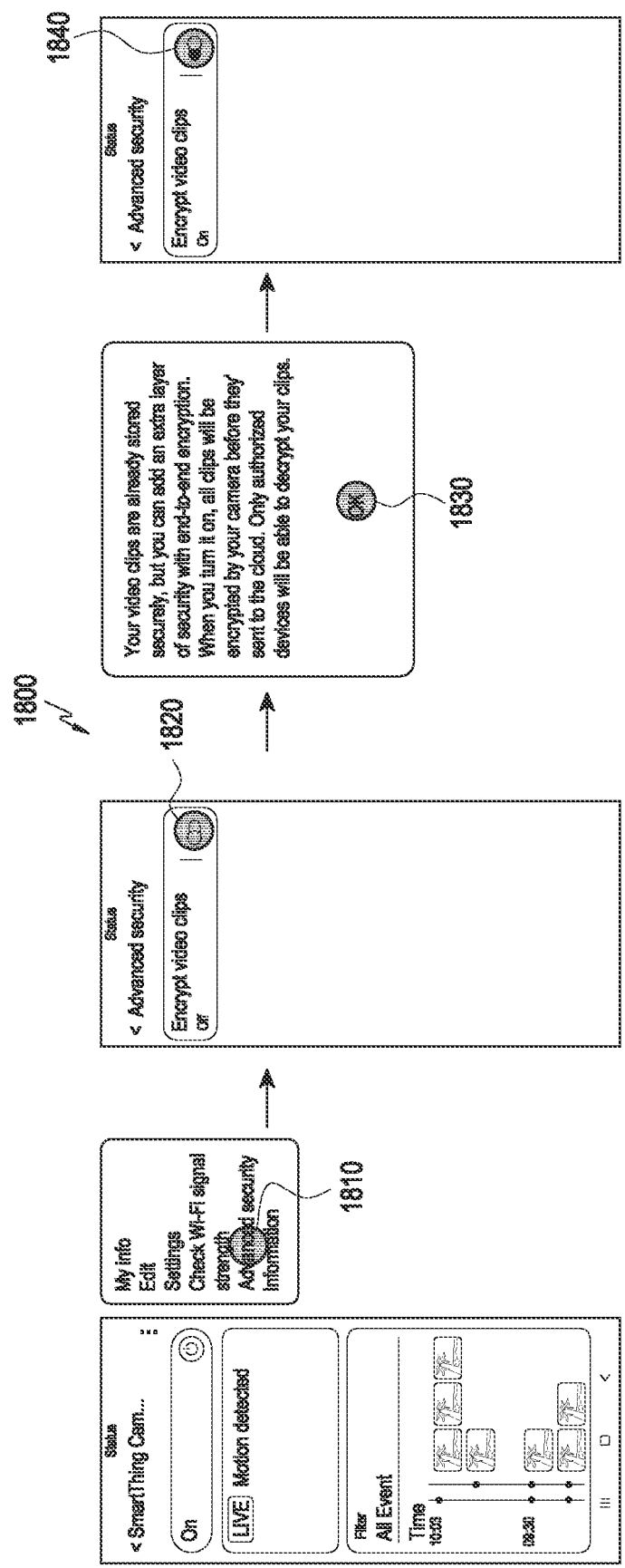
FIG. 18 is a diagram illustrating an example of an encryption configuration input according to various embodiments.

FIG. 18 is a diagram 1800 illustrating an example of an encryption configuration input according to various embodiments.

In an embodiment, the encryption configuration input may correspond to an input to the input unit 225 of the user terminal 220, which requests an encryption configuration change of the IoT device 230 as illustrated in FIG. 10. In an embodiment, when an input to select an advanced security 1810, which is one among options displayed on the display 224, is sensed through the input unit 225, the at least one processor 222 may display, on the display 224, an input button enabling ON/OFF selection of an encryption function of video clips.

In an embodiment, when a user's input on the input button displayed to be in an OFF state 1820 is sensed through the input unit 225, the at least one processor 222 may display sentences describing the encryption function on the display 224. In an embodiment, when a user's input on a confirm button 1830 displayed together with the sentences is sensed through the input unit 225, the at least one processor 222 may activate the encryption function, and the display 224 may display the input button to be in an ON state 1840. In an embodiment, when a user's input on the input button displayed to be in the OFF state 1820 is sensed through the input unit 225, the at least one processor 222 may activate, without separate additional displays or inputs, the encryption function, and the display 224 may display the input button to be in the ON state 1840. In an embodiment, when a user's input on the input button displayed to be in the ON state 1840 is sensed through the input unit 225, the at least one processor 222 may deactivate, without separate additional displays or inputs, the encryption function, and the display 224 may display the input button to be in the OFF state 1820.

Figure 19:
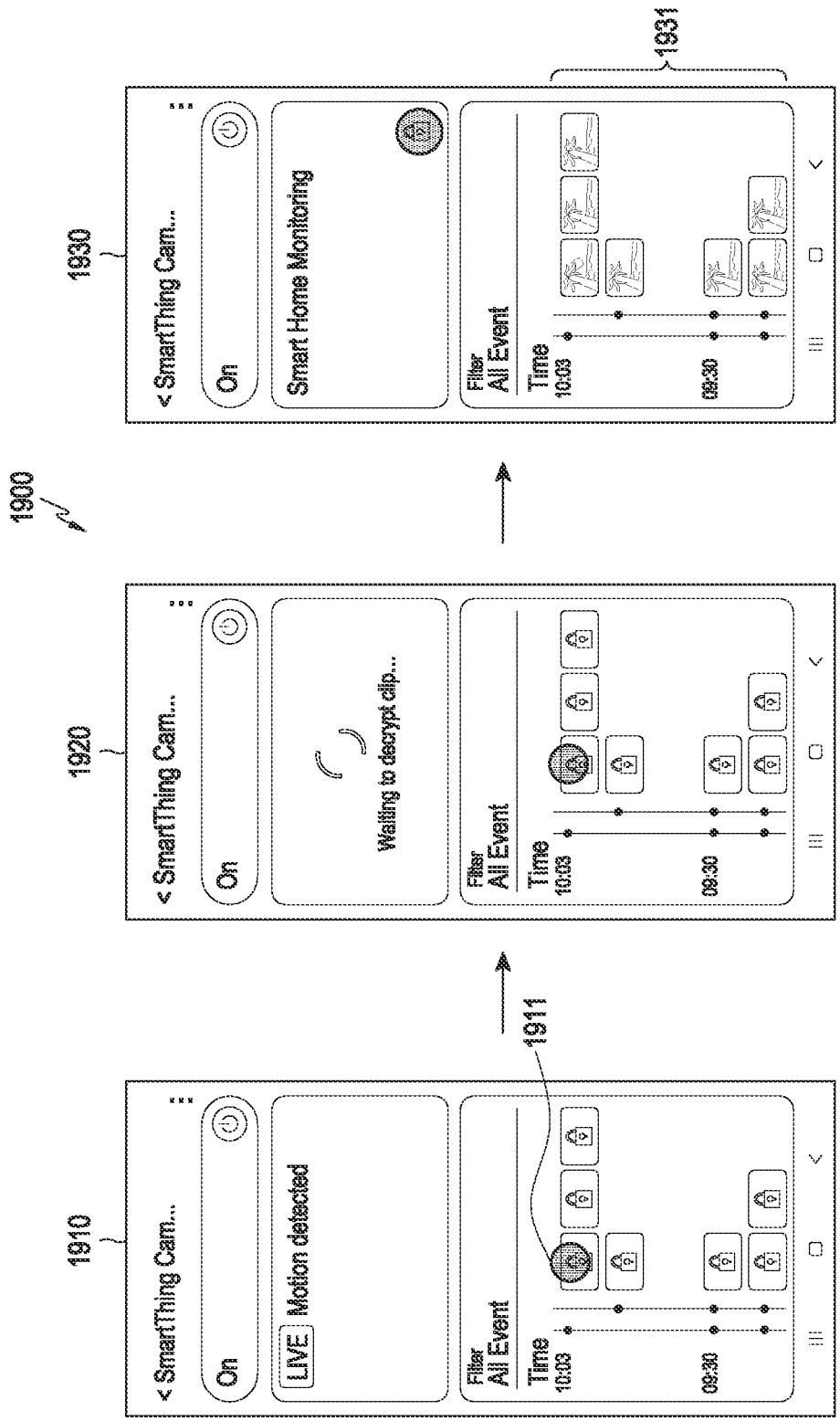
FIG. 19 is a diagram illustrating an example of decryption and reproduction of an encrypted video clip according to various embodiments.

FIG. 19 is a diagram 1900 illustrating an example of decryption and reproduction of an encrypted video clip according to various embodiments.

In an embodiment, the decryption and reproduction of the encrypted video clip may be triggered by a user input for requesting decryption of an encrypted video clip as illustrated in FIG. 12. In an embodiment, the memory 223 of the user terminal 220 may store at least one video clip which is encrypted.

In an embodiment, as indicated by reference numeral 1910, the at least one processor 222 of the user terminal 220 may sense, through the input unit 225, an input 1911 to request decryption of the at least one video clip stored in the memory 223. In an embodiment, the input 1911 may include a user input being sensed through the input unit 225, the user input being placed on at least one video clip among video clips selectively displayed on the display 224, or a particular button displayed on the display 224.

In an embodiment, as indicated by reference numeral 1920, the at least one processor 222 of the user terminal 220 may display, on the display 224 and in the type of a figure and/or a description phrase, that decryption of video clips are currently proceeding.

In an embodiment, as indicated by reference numeral 1930, when decryption of video clips is ended, the at least one processor 222 may display previews 1931 of the video clips on the display 225. In an embodiment, the at least one processor 222 may display only a preview of a video clip(s), the decryption of which is ended.

In FIG. 19, all the video clips stored in the memory 223 are decrypted by selection of one among video clips. In an embodiment, the at least one processor 222 may decrypt only at least one video clip selected by a user.

Figure 20:
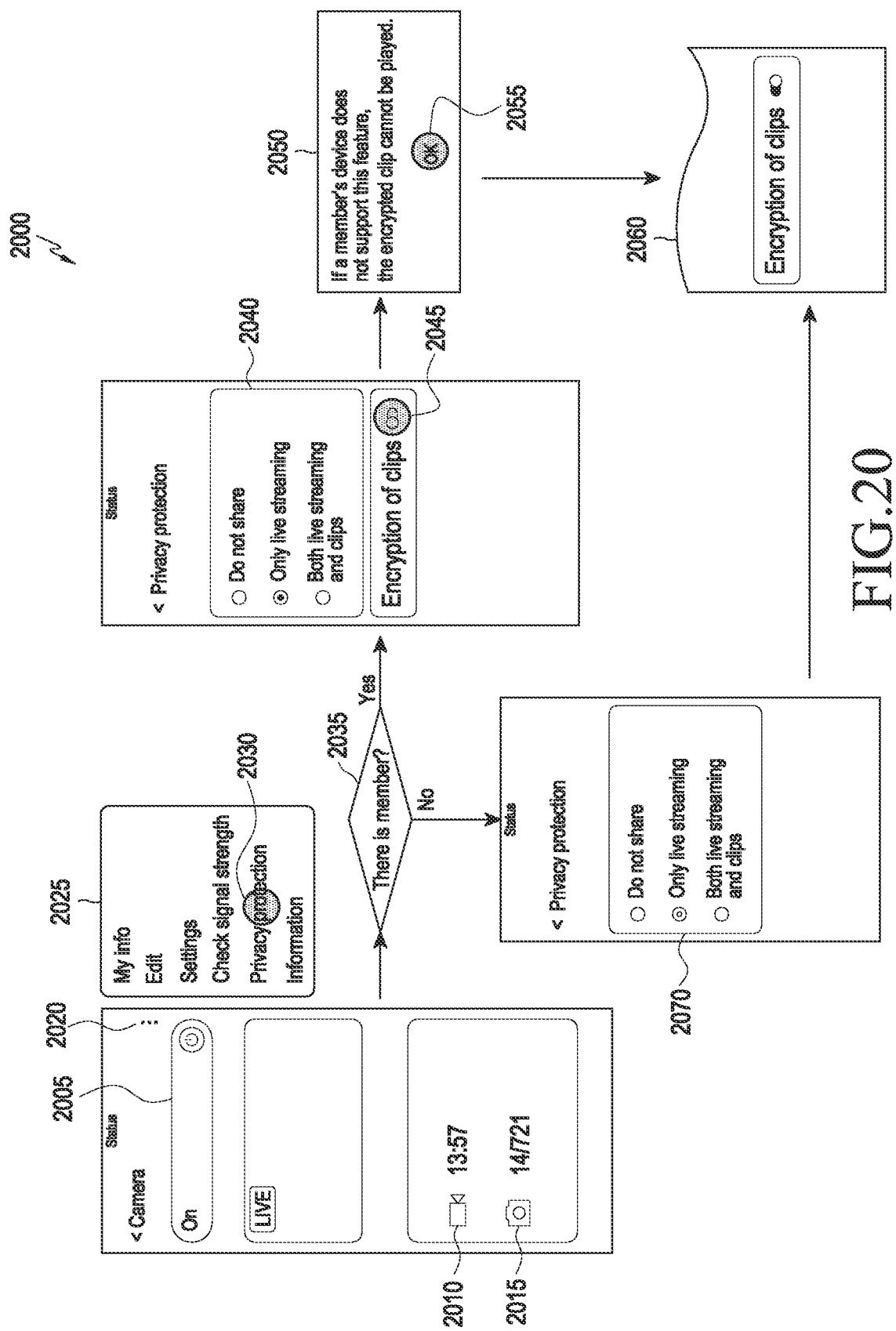
FIG. 20 is a diagram illustrating an example of a clip sharing configuration input according to various embodiments.

FIG. 20 is a diagram 2000 illustrating an example of a clip sharing configuration input according to various embodiments.

In an embodiment, the clip sharing configuration input may correspond to a user's input to request, through the input unit 225, a clip sharing configuration for a particular member other than an owner (or user) of the user terminal 220 as illustrated in FIG. 11.

In an embodiment, the display 224 of the user terminal 220 may display a power ON/OFF button 2005, a video clip capturing button 2010, and/or an image clip capturing button 2015 of the IoT device 230. In an embodiment, when an input on a menu display button 2020 is sensed, the display of the user terminal 220 may display a camera setting menu 2025.

In an embodiment, when an input to select a particular option 2030 in the camera setting menu 2025 is sensed through the input unit 225, the at least one processor 222 may determine whether there is a member to share a clip (as indicated by reference numeral 2035).

In an embodiment, in a case where there is a member to share a clip, the at least one processor 222 may display options 2040 related to a sharing range for the corresponding member on the display 224. In an embodiment, in a case where there is a member to share a clip, the at least one processor 222 may display, on the display 224, an input button 2045 enabling ON/OFF selection of encryption of clips to be shared with the member.

In an embodiment, when an input to select one among the options 2040, and/or an input on the input button 2045 is sensed through the input unit 225, a warning window 2050 may be displayed. In an embodiment, after an input on a confirm button 2055 of the warning window 2050 is sensed, an input button may be activated (as indicated by reference numeral 2060). In an embodiment, when an input to select one among the options 2040, and/or an input on the input button 2045 is sensed through the input unit 225, an input button may be activated (as indicated by reference numeral 2060).

In an embodiment, in a case where there is no member to share a clip, the at least one processor 222 may deactivate (as indicated by reference numeral 2070) the options 2035 to be unselectable. In an embodiment, an activation button 2060 for encryption of clips is displayed without displaying a separate warning window, and thus a user can activate the button. In an embodiment, the activation of the activation button 2060 may correspond to an input to trigger encryption of a clip to be generated in a camera device.

While various embodiments of the disclosure have been described with reference to various example embodiments thereof. A person having ordinary skill in the art to which the disclosure belongs will understand that various embodiments of the disclosure can be realized in a modified form without departing from the scope of the disclosure. Therefore, the disclosed embodiments should be considered from a descriptive viewpoint, rather than from a restrictive viewpoint. It should also be understood that any of the embodiment(s) described herein may be used in conjunction with any other embodiment(s) described herein.

What is claimed is:

1. A first electronic device comprising:
memory storing instructions;
a communication circuit; and
at least one processor,
wherein the instructions, when executed by the at least one processor, cause the first electronic device:
receive, through the communication circuit, a first public key and a first request for a first symmetric key from a second electronic device,
encrypt the first symmetric key using the first public key,
transmit, through the communication circuit, a request to store the first symmetric key, at least one identifier corresponding to the first symmetric key, and the encrypted first symmetric key, to the second electronic device,
generate at least one second symmetric key corresponding to at least one object,
encrypt the at least one object using the generated at least one second symmetric key,
encrypt each of the at least one second symmetric key using the first symmetric key, and
transmit, through the communication circuit, the encrypted at least one object and the encrypted at least one second symmetric key, to the second electronic device.

2. The first electronic device of claim 1, wherein the instructions, when executed by the at least one processor, cause the first electronic device to:
receive, through the communication circuit, a first certificate and a signature,
check the first certificate,
check the signature using the first public key, and
based on the checking of the first certificate and the checking of the signature being successfully passed, encrypt the first symmetric key using the first public key.

3. The first electronic device of claim 1, wherein the at least one identifier comprises at least one of a user identifier and a device identifier.

4. The first electronic device of claim 1, wherein the instructions, when executed by the at least one processor, cause the first electronic device to:
transmit, through the communication circuit, a second request for the first symmetric key and at least one identifier corresponding to the second request to the second electronic device,
receive, through the communication circuit, the encrypted first symmetric key from the second electronic device, and
decrypt the encrypted first symmetric key using a first secret key.

5. The first electronic device of claim 1, wherein the instructions, when executed by the at least one processor, cause the first electronic device to:
receive, through the communication circuit, a request to change an encryption configuration, at least one identifier corresponding to the request to change the encryption configuration, a configuration value, and a signature from the second electronic device, and
based on checking of the signature being successfully passed using a second public key of the second electronic device, change the encryption configuration based on the configuration value.

6. The first electronic device of claim 1, wherein the instructions, when executed by the at least one processor, cause the first electronic device to:
receive, through the communication circuit, a request to change a clip sharing configuration for a third electronic device, at least one identifier corresponding to the request to change the clip sharing configuration for the third electronic device, a configuration value, and a signature from the second electronic device, and
based on checking of the signature being successfully passed using a second public key of the second electronic device, change the clip sharing configuration for the third electronic device based on the configuration value.

7. The first electronic device of claim 1, wherein the instructions, when executed by the at least one processor, cause the first electronic device to:
receive, through the communication circuit, a request to share the first symmetric key with the second electronic device, at least one identifier corresponding to the request to share, a second certificate including a second public key, and a signature from the second electronic device,
based on checking of the signature being successfully passed using a public key of the second electronic device, encrypt the first symmetric key using the second public key, and
transmit the first symmetric key encrypted using the second public key to the second electronic device.

8. The first electronic device of claim 7, wherein the first symmetric key encrypted using the second public key is transmitted by a third electronic device capturing an image of a QR code displayed on the first electronic device, or the third electronic device using a UWB.

9. The first electronic device of claim 1, wherein the instructions, when executed by the at least one processor, cause the first electronic device to:
receive, through the communication circuit, a request to replace the first symmetric key, at least one identifier corresponding to the request to replace, a second certificate including a second public key, and a signature from the second electronic device,
based on checking of the signature being successfully passed using the second public key, generate a new first symmetric key, and
encrypt each of the at least one second symmetric key using the new first symmetric key.

10. A second electronic device comprising:
memory storing instructions;
a communication circuit; and
at least one processor,
wherein the instructions, when executed by the at least one processor, cause the second electronic device to:
obtain a certificate through integrity checking of the second electronic device,
transmit, through the communication circuit, a request to register the second electronic device, the certificate, and an identifier of the second electronic device, to a first electronic device,
transmit, through the communication circuit, a first public key and a first request for a first symmetric key to the first electronic device,
receive, through the communication circuit, the first symmetric key encrypted using the first public key from the first electronic device,
decrypt the encrypted first symmetric key using a first secret key,
transmit, through the communication circuit, a request for at least one object to the first electronic device,
receive, through the communication circuit and from the first electronic device, the at least one object encrypted using at least one second symmetric key, and the at least one second symmetric key encrypted using the first symmetric key,
decrypt the encrypted at least one second symmetric key using the first symmetric key, and
decrypt the encrypted at least one object using the at least one second symmetric key.

11. The second electronic device of claim 10, wherein the at least one processor is configured to:
receive, through the communication circuit, a request to share the first symmetric key with a third electronic device, at least one identifier corresponding to the request to share, a certificate including a third public key, and a signature from the first electronic device,
based on checking of the signature being successfully passed using a second public key of the second electronic device, encrypt the first symmetric key using the third public key, and
transmit the first symmetric key encrypted using the third public key to the third electronic device.

12. The second electronic device of claim 11, wherein the first symmetric key encrypted using the third public key is transmitted by the third electronic device capturing an image of a QR code displayed on the second electronic device, or the third electronic device using a UWB.

13. A method for providing an encrypted object by a first electronic device, the method comprising:
receiving a first public key and a first request for a first symmetric key from a second electronic device;
encrypting the first symmetric key using the first public key;
transmitting a request to store the first symmetric key, at least one identifier corresponding to the first symmetric key, and the encrypted first symmetric key, to the second electronic device;
generating at least one second symmetric key corresponding to at least one object;
encrypting the at least one object using the generated at least one second symmetric key;
encrypting each of the at least one second symmetric key using the first symmetric key; and
transmitting the encrypted at least one object and the encrypted at least one second symmetric key, to the second electronic device.

14. The method of claim 13, further comprising:
receiving a first certificate and a signature;
checking the first certificate;
checking the signature using the first public key; and
based on the checking of the first certificate and the checking of the signature being successfully passed, encrypting the first symmetric key using the first public key.

15. The method of claim 13, wherein the at least one identifier comprises at least one of a user identifier and a device identifier.

* * * * *